US009827591B2

(12) United States Patent
Wieand et al.

(10) Patent No.: US 9,827,591 B2
(45) Date of Patent: Nov. 28, 2017

(54) MELTING AND SPINNING DEVICE

(71) Applicant: Crayola LLC, Easton, PA (US)

(72) Inventors: David E. Wieand, Allentown, PA (US); Matthew T. Carden, Nashville, TN (US); Eric A. King, Thompson's Station, TN (US); Christopher C. Giering, Nashville, TN (US)

(73) Assignee: Crayola, LLC, Easton, PA (US)

( * ) Notice: Subject to any disclaimer, the term of this patent is extended or adjusted under 35 U.S.C. 154(b) by 195 days.

(21) Appl. No.: 14/702,652

(22) Filed: May 1, 2015

(65) Prior Publication Data
US 2015/0314328 A1 Nov. 5, 2015

Related U.S. Application Data

(60) Provisional application No. 61/987,193, filed on May 1, 2014.

(51) Int. Cl.
| | | |
|---|---|---|
| *B44D 3/00* | (2006.01) | |
| *B44D 2/00* | (2006.01) | |
| *A63H 33/22* | (2006.01) | |
| *B05B 13/02* | (2006.01) | |
| *B05D 5/00* | (2006.01) | |
| *B05D 5/06* | (2006.01) | |
| *B05D 1/00* | (2006.01) | |
| *B29C 67/00* | (2017.01) | |

(52) U.S. Cl.
CPC .............. *B05D 5/00* (2013.01); *A63H 33/22* (2013.01); *B05B 13/0228* (2013.01); *B05D 1/002* (2013.01); *B05D 5/06* (2013.01); *B44D 2/00* (2013.01); *B44D 3/00* (2013.01); *B05D 1/005* (2013.01); *B29C 67/0007* (2013.01)

(58) Field of Classification Search
None
See application file for complete search history.

(56) References Cited

U.S. PATENT DOCUMENTS

| | | | | |
|---|---|---|---|---|
| 1,381,500 A | * | 6/1921 | Reader | H05B 3/00 |
| | | | | 219/421 |
| 4,078,909 A | * | 3/1978 | Dietzsch | B29C 47/26 |
| | | | | 425/217 |
| 4,550,679 A | * | 11/1985 | Pipa | B05C 9/022 |
| | | | | 118/320 |
| 5,123,569 A | * | 6/1992 | Lindner | B29C 67/241 |
| | | | | 219/421 |

(Continued)

*Primary Examiner* — Binu Thomas
(74) *Attorney, Agent, or Firm* — Shook, Hardy & Bacon L.L.P.

(57) ABSTRACT

A device, method, and system for creating a design on a design surface are provided. The device includes a first compartment that includes a receiving and positioning component and a channel configured to receive and position a wax stick at the receiving and positioning component. The device includes a second compartment having a melting component that includes a heating element, a temperature measurement element, and a nozzle. The nozzle includes a nozzle opening configured to receive the wax stick, the nozzle directly aligned with the channel of the receiving and positioning component. The nozzle also includes a nozzle tip configured to transfer melted portions of the wax stick from the nozzle to a design surface on a spinning component in a third compartment of the device.

16 Claims, 14 Drawing Sheets

(56) References Cited

U.S. PATENT DOCUMENTS

| | | | | |
|---|---|---|---|---|
| 5,242,496 A | * | 9/1993 | Handy | B05B 13/0228 118/320 |
| 5,553,643 A | * | 9/1996 | Goldfarb | B44D 3/00 118/52 |
| 6,113,696 A | * | 9/2000 | Tseng | B29C 31/045 118/313 |
| 6,935,535 B2 | * | 8/2005 | Pandolfi | A45D 26/0014 141/375 |
| 2005/0008729 A1 | * | 1/2005 | Fernandez | A63H 33/001 425/256 |
| 2006/0170157 A1 | * | 8/2006 | Weingard | A63H 33/22 273/236 |
| 2015/0336300 A1 | * | 11/2015 | McCauley | B29C 67/241 264/319 |

* cited by examiner

MELTING AND SPINNING DEVICE

CROSS-REFERENCE TO RELATED APPLICATIONS

This application claims priority to U.S. Provisional Patent Application No. 61/987,193, filed May 1, 2014, entitled "Melting and Spinning Device," the entire contents of which is hereby incorporated by reference.

SUMMARY

Embodiments of the invention are defined by the claims below, not this summary. A high-level overview of various aspects of the invention is provided here for that reason, to provide an overview of the disclosure, and to introduce a selection of concepts that are further described below in the detailed description section. This summary is not intended to identify key features or essential features of the claimed subject matter, nor is it intended to be used as an aid in isolation to determine the scope of the claimed subject matter. The scope of the invention is defined by the claims.

In brief, and at a high level, this disclosure describes, among other things, a melting and spinning device for creating a design on a design surface. The device may have a first compartment that is partially enclosed with respect to a user. In embodiments, the first compartment includes a receiving and positioning component having a channel configured to receive and position a wax stick. The receiving and positioning component may include a cover for selectively providing access to the channel. The device may further include a second compartment that is substantially and/or fully enclosed with respect to the user. In embodiments, the second compartment includes a melting component having a heating element, a temperature measurement element, and a nozzle, the nozzle having a nozzle opening and a nozzle tip. The nozzle opening may be directly aligned with the channel of the receiving and positioning component and configured to receive the wax stick. The nozzle tip may be configured to transfer melted portions of the wax stick from the nozzle to the design surface, which may be located in a third compartment of the device. The nozzle tip may be directly aligned with a portion of the third compartment, such as a portion of the design surface secured in the third compartment. The third compartment may include a spinning component coupled to a motor component to allow the melted portions of the wax stick to be distributed radially on the design surface. The device may further include a releasing mechanism that selectively controls movement of the wax stick from the channel to the melting component, and one or more latching mechanisms which prevent access to the first and/or the third compartment when the heating element and/or spinning component are in operation.

DESCRIPTION OF THE DRAWINGS

Illustrative embodiments of the invention are described in detail below with reference to the attached drawing figures, wherein like elements are depicted with like reference numerals, and wherein.

DETAILED DESCRIPTION

Figure 1:
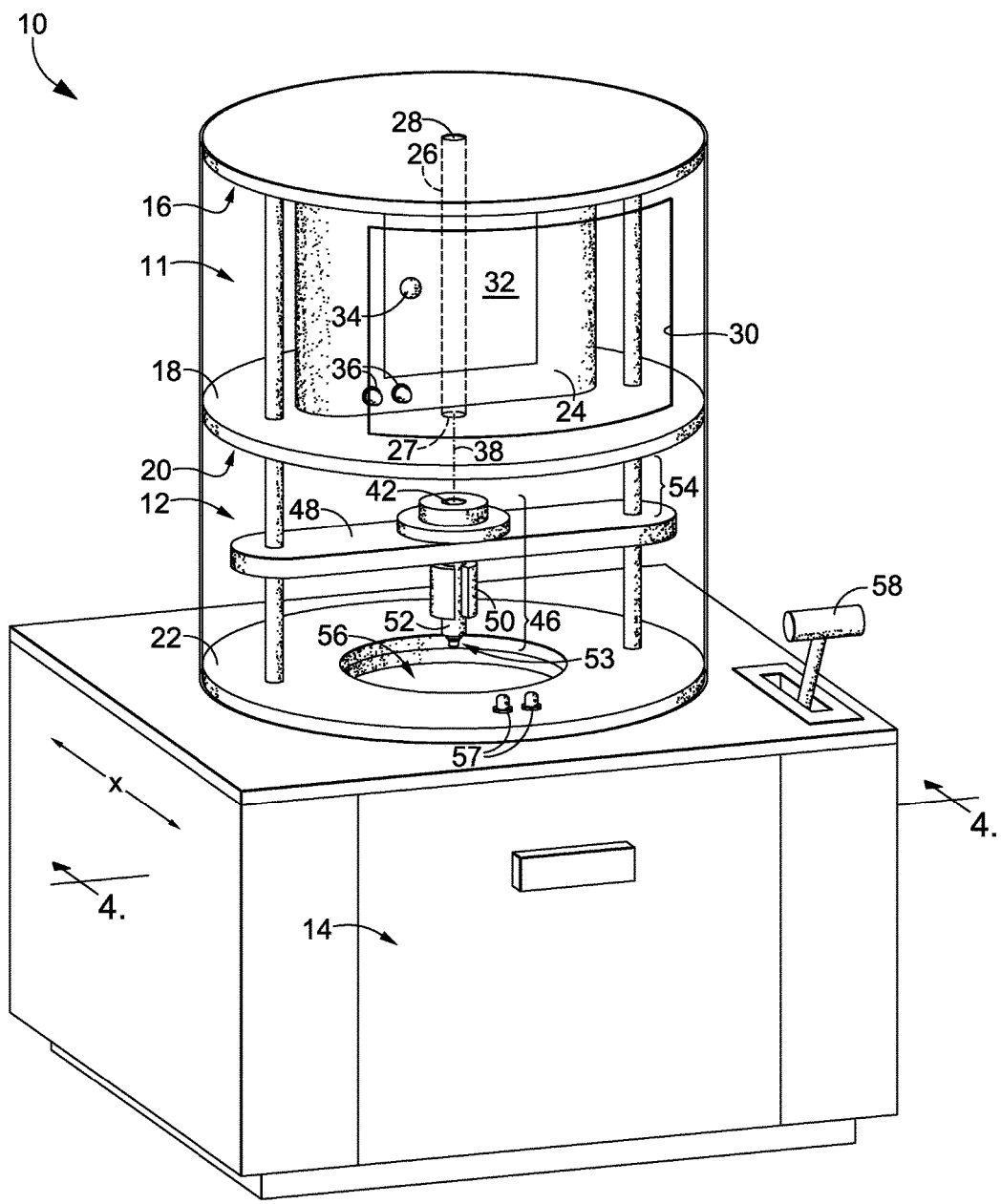
FIG. 1 is a front perspective view of a melting and spinning device with a third compartment of the device in a closed position, in accordance with an embodiment of the present invention.

The subject matter of select embodiments of the invention is described with specificity herein to meet statutory requirements. However, the description itself is not intended to limit the scope of the claims. Rather, the claimed subject matter might be embodied in different ways to include different components, elements, features, steps, or combinations thereof, similar to the ones described in this document, and in conjunction with other present or future technologies. Terms should not be interpreted as implying any particular order among or between various steps herein disclosed unless and except when the order of individual steps is explicitly described or required.

Embodiments of the invention include a melting and spinning device for creating a design on a design surface. The device may have a first compartment that is partially enclosed with respect to a user. In embodiments, the first compartment includes a receiving and positioning component having a channel configured to receive and position a wax stick. The device may further include a second compartment that is substantially and/or fully enclosed with respect to the user. In embodiments, the second compartment includes a melting component having a selectively operable heating element, a temperature measurement element, and a nozzle, the nozzle having a nozzle tip and a nozzle opening. The nozzle opening may be configured to receive the wax stick and may further be directly aligned with the channel of the receiving and positioning component. The nozzle tip may be configured to transfer melted portions of the wax stick from the nozzle to the design surface in a third compartment.

According to one embodiment of the invention, the device may include a releasing mechanism and/or travel stop between the channel and the nozzle to prevent and/or restrict movement of the wax stick from the channel to the nozzle until the nozzle has reached a desired temperature and/or a cover has been closed to prevent access to the channel. Embodiments of the invention include a third compartment having at least a portion of a spinning component coupled to a drawer that can be pulled out to place a design surface on the spinning component and pushed back in to realign the design surface of the third compartment with the melting nozzle of the second compartment.

In one embodiment of the invention, the third compartment drawer includes both a spinning component for supporting a design surface and a motorized device for powering the spinning component. In another embodiment, the third compartment drawer includes a moveable spinning component while a stationary base includes a motor corresponding to the spinning component. In this embodiment, when the drawer of the third compartment is closed, the spinning component and the motor magnetically align and/or are coupled in response to magnetic alignment such that the motor may drive the spinning component. Upon opening of the drawer, in one embodiment, the separation of the spinning component from the previously coupled motor provides user access to the design surface of a non-activated spinning component, without shifting the position of the motor within the stationary base.

In one embodiment, the nozzle tip may be directly aligned with a portion of the third compartment, such as a portion of the design surface secured in the third compartment. As such, in some aspects, the melting and spinning device includes a corresponding alignment between a receiving and positioning component of a first compartment, a melting component and/or nozzle of a second compartment, and a design surface and/or spinning component of a third compartment. Based on such alignment, coordination of heating, melting, and spinning, and corresponding triggering of opening and closing one or more compartments, a drip and spin device may be used to generate a design artwork from melted wax, with minimal user access to the internal features of the device. For example, without user exposure to the melting features of the melting component and/or nozzle, the user may both deposit at least one wax stick in a particular position with respect to the device, and subsequently retrieve their user-generated artwork from a particular position with respect to the device, while minimizing exposure to the melted crayon and/or melting components throughout the dripping and spinning process.

Additionally, the device may be configured such that activation of the heating element, dropping of the wax stick into the nozzle, and distribution of melted portions of the wax onto the design surface only occur when the cover is secured and/or closed, blocking access to the channel of the receiving and positioning component as well as any portion of the second compartment. In one embodiment, the cover of the first compartment and the third compartment may be configured to remain inaccessible to a user of the device during operation of the device. For example, a control component of the dripping and spinning device may be configured to control and/or coordinate various features and phases of device use, such as the first compartment cover door remaining in a secured and/or closed position while the heating element is activated, the third compartment spinning component drawer remaining secured and/or closed while the spinning component is moving, the third compartment spinning component drawer remaining secured for a particular threshold time while the melted wax is permitted to dry on the design surface, etc. In one example, control of one or more features of the dripping and spinning device (e.g., securing or releasing a first compartment door, suspending or activating a travel stop, heating or discontinuing heating a second compartment melting component and/or nozzle, activating or deactivating a motor associated with a spinning component, etc.) may be coordinated in association with one or more device control components, such as a programmable logic controller (PLC) associated with the melting and spinning device.

In further embodiments, a system for creating a design on a design surface is provided. The system may include a receiving and positioning component for receiving and positioning one or more wax sticks. The system may further include a melting component for melting the one or more wax sticks to provide melted portions of the one or more wax sticks. Additionally, a spinning component may be included in the system. The spinning component may be used for spinning the design surface that receives the melted portions of the one or more wax sticks from the melting component in a radially distributed fashion.

In yet another embodiment, a method for creating a design on a design surface is provided. The method may include receiving a wax stick at a receiving and positioning component. The wax stick may then be transferred from the receiving and positioning component to a melting component. At the melting component, the wax stick may be melted to produce one or more melted portions of the wax stick using a controlled temperature process. The method may further include receiving the one or more melted portions of the wax stick at a spinning component. Finally, the method may include spinning the spinning component to disperse the one or more melted portions of the wax stick provided from the melting component in a radial direction on the design surface.

Turning first to FIG. 1, a front perspective view of an exemplary melting and spinning device ("the device") 10 is illustrated, where the device 10 includes a first compartment 11, a second compartment 12, and a third compartment 14, with the third compartment 14 in a closed position. The first compartment 11 may include a receiving and positioning component 24 for receiving and positioning a wax stick, such as an unwrapped crayon (e.g., a Crayola® crayon), for transfer to the second compartment 12. The second compartment 12 may include a melting component 46 for receiving and melting the received/positioned wax stick, in order to provide melted portions of the wax stick, such as, for example, droplets of melted wax. Such melted portions of the wax stick may then drip from the melting component 46 of the second compartment 12 into the third compartment 14, which may include a spinning component. As will be discussed in more detail with respect to FIGS. 3-5, the spinning component may spin a design surface that receives the melted portions of the wax stick, and thereby may cause the melted portions of the wax stick to be dispersed in a radial direction. Embodiments of each compartment, and the components that may be included therein, are described in greater detail below.

In embodiments, the first compartment 11 is partially enclosed with respect to a user, such that the interior of the first compartment 11 is accessible to the user through a first compartment opening 30. As mentioned, the first compartment 11 may include a receiving and positioning component 24. In embodiments, the receiving and positioning component 24 may include a channel 26 that is configured to receive and position a wax stick. In further embodiments, the channel 26 is accessible via a repositionable cover 32 on the receiving and positioning component 24 and/or associated with the first compartment 11. During at least one phase of operation of the device 10, the cover 32 may be opened by a user, in order for the user to provide a wax stick to the channel 26. In embodiments, the cover 32 may be a hinged cover, a slidable cover, a rollaway cover, or any other cover that may be repositioned between at least a first position and a second position, where the first position allows a user to access the channel 26 and the second position prevents the user from accessing the channel 26. In further embodiments, the cover 32 includes a handle 34 that may be used to open and close the cover 32. Thus, the first compartment 11 may be configured to allow a user to reach through the first compartment opening 30 and open the cover 32 in order to access the channel 26.

A first lighting component 36 may, in embodiments, be configured to indicate a state of the cover 32. The state of the cover 32 may include a locked state and an unlocked state. For example, if the device 10 is ready for a user to provide a wax stick at the receiving and positioning component 24, the first lighting component 36 may display a green light, indicating that the cover 32 is unlocked. After the user provides the wax stick to the receiving and positioning component 24, and the device 10 begins to process the wax stick according to the melting and spinning process described herein, a lock on the cover 32 might engage in order to prevent a user from opening the cover 32 during such processing, for added safety, and to prevent breaking of the wax stick due to reopening of the cover 32. In this circumstance, the first lighting component 36 may display a red light to indicate that the cover 32 is locked and cannot be opened. The cover 32 may remain locked, and, accordingly, the first lighting component 36 may continue to display a red light until the current cycle of the melting and spinning process is complete. When the current cycle is complete, and when the device 10 is once again ready for a user to provide a wax stick to the receiving and positioning component 24, the lock on the cover 32 may be disengaged, and the first lighting component 36 may once again display a green light to indicate that the cover 32 is unlocked. Such locking and lighting may be coordinated via a contact-activated locking component, such as an electromagnetic lock component. For example, when the cover 32 is shut, an electromagnet may contact an electromagnetic sensor, such as a Hamlin #59135-010 magnetic sensor, thereby completing a circuit, causing a lock on the cover 32 to engage and a red light to be displayed at the first lighting component 36.

In embodiments, the first lighting component 36 includes one or more lighting elements, such as the two lighting elements illustrated in FIG. 1. The lighting elements may correspond to different colors of lights. In further embodiments, a single lighting element may be included in the first lighting component 36. The single lighting element may display multiple colors. Additionally or alternatively, the single lighting element might not display different colors. For example, the single lighting element may be lit to indicate a locked or unlocked state and unlit to indicate the opposite state. In any of these embodiments, the lighting element may be an LED light or any other type of lighting element suitable for illuminating at least a portion of the first lighting component 36.

In embodiments of the invention, after a wax stick has been provided to the channel 26, the wax stick may be transferred, through the channel opening 27, to the second compartment 12. This transfer from the first compartment 11 to the second compartment 12 may be achieved in a variety of manners. In embodiments, the wax stick is pulled downward by gravity. In further embodiments, the receiving and positioning component 24 may include a releasing mechanism, or travel stop, to activate releasing of the wax stick. Such a releasing mechanism might obstruct the channel opening 27 when the cover 32 is in an open position. When the cover 32 is moved to a closed position, the release mechanism may allow transfer of the wax stick from the channel 26, via the channel opening 27, to a desired location in the second compartment 12. Additionally or alternatively, the receiving and positioning component 24 may include an advancing mechanism that advances a wax stick from the channel 26 to a desired location in the second compartment 12.

Figure 2:
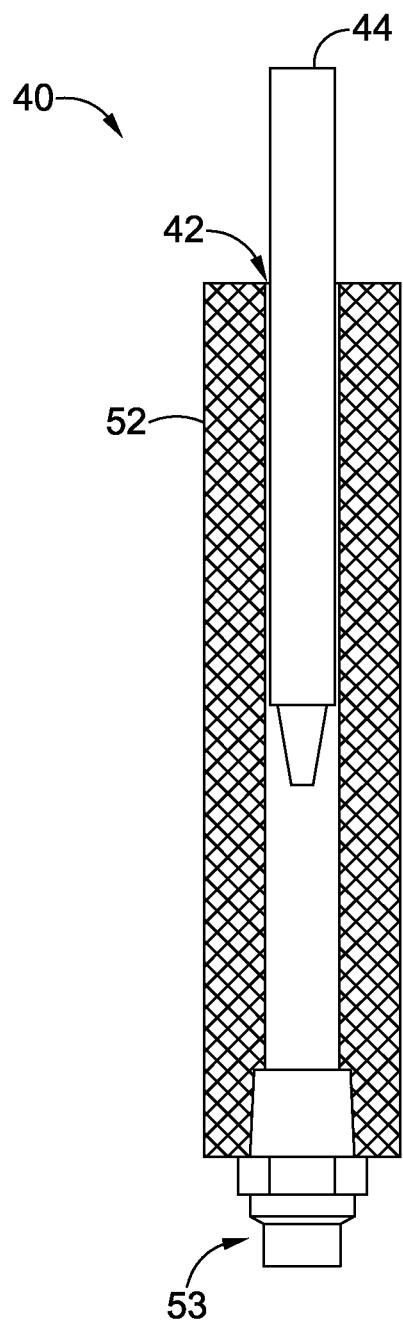
FIG. 2 is a cross-sectional view of the nozzle of FIG. 1, in accordance with an embodiment of the present invention.

The second compartment 12 may include a melting component 46. In embodiments, the melting component 46 is suspended at a position within the second compartment 12 by a support element 48. The melting component 46 includes a nozzle 52 having a nozzle tip 53 and a nozzle opening 42. In embodiments, the nozzle 52 is an aluminum drip nozzle. FIG. 2 illustrates an exemplary cross-sectional view 40 of the nozzle 52 of FIG. 1. The nozzle 52 may include one or more heating elements and/or temperature measurement elements, and the entire nozzle 52 may be made of thermally conductive metal to allow distribution of heat throughout the nozzle 52. A temperature measurement element, such as a thermocouple, may be integrated with the nozzle 52 to provide temperature measurements. As shown, the nozzle 52 and the nozzle opening 42 are configured to receive a wax stick 44 at the nozzle opening 42. In some embodiments, a length of the nozzle 52 is configured to receive the entire wax stick 44. In further embodiments, the length of the nozzle 52 is configured to receive only a portion of the wax stick 44 at one time, such that an upper portion of the wax stick 44 remains outside of the nozzle 52 until a lower portion of the wax stick 44 melts. In this way, a user may view the progression of the wax stick 44 through the nozzle 52 as portions of the wax stick 44 melt. The nozzle tip 53 may be configured to transfer melted portions of the wax stick 44 out of the nozzle 52. In embodiments, the tip 53 is aligned with one or more features of the third compartment 14. In further embodiments, the tip 53 may be a removable tip, which is discussed in more detail below.

Returning to the embodiments of FIG. 1, the nozzle opening 42 may be directly aligned with the channel 26 such that a wax stick may pass through the channel opening 27, travel along a path 38 based on a gravitational pull, and be received by the nozzle opening 42. Such direct alignment may ensure a successful transfer of a wax stick from the channel 26 to the nozzle opening 42 by gravitational force. A size of the nozzle opening 42 may be optimized to account for variations between the actual path traveled by the wax stick and the orientation and/or alignment associated with the path 38. For example, common variations in the actual path traveled may be caused by a size, weight, and/or center of gravity of a wax stick. As such, a size and/or location of the nozzle opening 42 may be adjusted to account for such variations. Additionally or alternatively, the nozzle 52 may be tapered such that a portion of the nozzle 52 near the nozzle opening 42 is larger than a portion of the nozzle 52 near the tip 53.

Furthermore, in some embodiments, such variations may be minimized by optimizing a distance between the channel opening 27 and the nozzle opening 42. For example, the distance between the channel opening 27 and the nozzle opening 42 may be based on a standard length of a wax stick provided for use with the device 10. If such distance is approximately the same as the standard length of a wax stick, then an amount of time associated with a free fall of the wax stick from the channel opening 27 to the nozzle opening 42 may be reduced and/or eliminated, such that there is little opportunity for the actual path traveled by the wax stick to vary from the path 38. Thus, in embodiments, the distance between the channel opening 27 and the nozzle opening 42 is slightly less than the standard length of a wax stick. In further embodiments, the channel opening 27 may be directly adjacent to the nozzle opening 42, such as by positioning the nozzle 52 directly adjacent to the top surface 20 of the second compartment 12, or contain an extension of the channel 26 to provide a continuous enclosed travel path. A releasing mechanism may also be positioned directly adjacent to the channel opening 27 to control the release of a wax stick into the nozzle opening 42.

Variations in the actual path traveled by the wax stick may also be minimized by tapering the channel 26. For example, a portion of the channel 26 exposed to a user may be sufficiently large for a user (e.g., a small child), such that the user can easily place the wax stick in the channel 26, while a lower portion of the channel 26 may be tapered, such that the lower portion is approximately the same size as the wax stick. Such tapering may aid in precisely positioning the wax stick for transfer to the nozzle opening 42.

In embodiments, the melting component 46 may further include a heating element 50 that provides heat sufficient to melt the wax stick into one or more melted portions of the wax stick. Such melted portions of the wax stick may pass through the tip 53 of the nozzle 52 prior to transfer of the melted portions of the wax stick from the second compartment 12 to the third compartment 14. For example, the wax stick may be received as a solid wax stick at the nozzle opening 42, and after processing at the melting component 46, may be transferred from the tip 53 of the nozzle 52 as melted portions of the wax stick, such as droplets of melted wax, to the third compartment 14 through the second compartment opening 56 in the bottom surface 22 of the second compartment 12.

In embodiments, the heating element 50 is a heating collar and/or a band heater that is positioned directly adjacent to the nozzle 52. For example, the heating element 50 may be a high-temperature heating nozzle band heater, such as a mica-insulated band heater and/or a mineral-insulated band heater. Such a heating collar and/or band heater may surround an outer surface of the nozzle 52, such that the heating collar and/or band heater is coupled to the outer surface of the nozzle 52 and transfers heat through the outer surface of the nozzle 52 to the interior of the nozzle 52 where the wax stick is positioned. The heating collar and/or band heater may wrap around the nozzle 52, which is characterized by a cylindrical configuration in some embodiments. The temperature measurement element may be positioned anywhere in and around the heating element 50 and the nozzle 52 such that it is in thermal communication with the nozzle 52 and can provide temperature measurements of the nozzle 52.

The configuration of the nozzle 52 and the heating element 50 may be advantageous for at least several reasons. For example, it may be undesirable to allow the wax stick to remain in contact with a heat source for a prolonged period of time. Such prolonged contact may cause the wax to burn, potentially creating an unpleasant odor, a buildup of residue, and a safety hazard. By heating the nozzle 52 prior to the releasing mechanism dropping the wax stick for melting, the wax stick may immediately begin melting and dripping from the nozzle 52. This minimizes the risk of overheating and/or burning the wax. This immediate melting may also expedite a user's experience and reduce wait times for subsequent users. Additionally, the nozzle 52 may include a diffusing element, such as a diffuser, that retains unmelted portions of the wax stick in the nozzle 52 and allows melted portions of the wax stick to pass through the tip 53. In this way, the diffusing element may prevent shards of the unmelted wax stick from passing through the tip 53. The diffusing element may thus avoid prolonged contact between the nozzle 52 and the melted portions of the wax stick and, at the same time, ensure that the unmelted portions of the wax stick remain within the nozzle 52 for a period of time sufficient for melting the unmelted portions.

The tip 53 of the nozzle 52 may be removable, in embodiments. Additionally or alternatively, a removable nipple may be positioned at the tip 53. The removable tip and/or removable nipple may be positioned at a portion of the nozzle 52 corresponding to the last area of contact between the melted portions of the wax stick and the nozzle 52. In other words, the removable tip and/or removable nipple may be positioned at a portion of the nozzle 52 that is susceptible to the buildup of cooled wax. When removably coupled to the nozzle 52, the tip and/or nipple may be easily removed for cleaning and/or replacement with a clean tip and/or nipple. The removable tip and/or removable nipple may further be a disposable tip and/or disposable nipple, such that they may be easily removed, disposed, and replaced by a new, clean nipple. Upon removing the removable tip and/or nipple, a maintenance operator may easily clean the other surfaces with which the wax stick, including melted portions of the wax stick, comes into contact. For example, a cleaning tool, such as a cleaning rod with wire bristles, may be inserted at an access point 28 in the top surface 16 of the first compartment 11. Such a cleaning tool may reach all the way through the channel 26, out of the channel opening 27, into the nozzle opening 42, and all the way through the nozzle 52. Because each of these items may be directly aligned with one another, a single cleaning tool may be used to simultaneously clean all items.

Continuing on with respect to the melting component 46, embodiments of the melting component 46 may be operatively coupled to a melting control component that includes a temperature-measuring device, such as a thermocouple (e.g., ProSense® THMJ-B01L06-01), and that controls, among other things, the temperature of the heating element 50. In embodiments, the melting control component includes a rheostat, such as a Lutron® t-1000 rheostat, for controlling a temperature of the heating element 50, and thereby controlling a temperature at the nozzle 52. In further embodiments, the melting control component includes a temperature controller, such as a SOLO® SL4824-VR, for controlling a temperature of the heating element 50, and thereby controlling a temperature at the nozzle 52. The rheostat and/or temperature controller may allow the temperature to be adjusted up or down until an optimized and/or desired temperature for melting a wax stick is achieved. For example, the thermocouples may measure a temperature at the nozzle 52, and in response, the rheostat and/or temperature controller may be used to increase or decrease the temperature of the heating element 50 to maintain a desired temperature at the nozzle 52. In embodiments, the temperature at the heating element 50 and/or the nozzle 52 is maintained at 230 degrees Fahrenheit. The heating element 50 may remain in an active state between uses, such that an attempt is made to maintain the heating element 50 at a fixed temperature. Additionally or alternatively, a temperature at the heating element 50 may be reduced between uses in order to, among other things, save energy. Such temperature adjustments may be made manually at the rheostat, temperature controller, and/or other melting control component. Additionally or alternatively, such temperature adjustments may be made automatically according to a program for controlling the rheostat, temperature controller, and/or other melting control component. This temperature control may be useful in preventing the overheating and/or burning of wax, as well as the associated unpleasant odor, buildup of residue, and safety hazards.

As mentioned, embodiments of the heating element 50 provide heat sufficient to melt wax sticks. Thus, the heat provided at the melting component 46 could cause injury, such as a burn injury, if a user contacts the melting component 46. To avoid such injury, the second compartment 12, which includes the melting component 46, may be substantially and/or fully enclosed with respect to a user. Unlike the first compartment 11, which may include a first compartment opening 30 permitting user access to the receiving and positioning component 24, the second compartment 12, including the melting component 46 therein, may be configured such that the interior of the second compartment 12 is substantially inaccessible to a user. As will be discussed in greater detail below, the second compartment 12 may include a second compartment opening 56, but this second compartment opening 56 is not configured to permit user access to the interior of the second compartment 12. Unlike the first compartment opening 30, a user is unable to reach through the second compartment opening 56, because the second compartment opening 56 is not exposed to the user. Thus, the second compartment 12 is substantially inaccessible to a user, or in other words, the second compartment 12 is substantially and/or fully enclosed with respect to a user, as the second compartment opening 56 substantially precludes user access to the second compartment 12. The second compartment 12 may, in embodiments, include some additional openings, such as perforations, while still substantially precluding user access to the second compartment 12.

In order to further promote user safety, the melting component 46 may, in embodiments, be separated from the bottom surface 18 of the first compartment 11 by at least a threshold distance, such as the distance 54. This separation may reduce the transfer of heat from the heating element 50 included in the melting component 46 to the surfaces of the first compartment 11 with which the user may come into contact. As mentioned, the distance between the channel opening 27 and the nozzle opening 42 may be based on a standard length of a wax stick provided for use with the device 10. This distance may also be optimized based on the safety concerns discussed above. Additionally, because the melting component 46 may be suspended within the second compartment 12 by the support element 48, the melting component 46 may also be separated from the surfaces enclosing the second compartment 12, with which the user may also come into contact. Thus, the melting component 46 may be isolated in such a way as to minimize the risk of a heat-related injury that might be caused by the transfer of heat from the heating element 50 to the exterior surfaces of the device 10 with which the user may come into contact.

Additionally, in embodiments, a separation between the top surface 20 of the second compartment 12 and the melting component 46 may be configured to permit user viewing of the wax stick as it progresses through the nozzle 52. In other words, in embodiments where the nozzle 52 is directly adjacent to the top surface 20 of the second compartment 12, the transfer of the wax stick to the melting component 46 and the subsequent melting of the wax stick may not be visible to viewers. In embodiments where there is a separation between the top surface 20 and the melting component 46, however, the transfer and subsequent melting may be viewable, such as through a viewing window, or with a camera. There may additionally be a screen, monitor, or other user interface element configured to display images, video, and sound outside of the device, including video of the spinning process, or other video which can be played during wait periods.

In further embodiments, the support element 48 is repositionable with respect to the top surface 20 of the second compartment 12. Because the melting component 46 may be coupled to the support element 48, repositioning the support element 48 may provide customizable views of the melting component 46. For example, if a user is relatively short, the support element 48 may be lowered such that the user can observe the melting of the wax stick. Similarly, if a user is relatively tall, the support element 48 may be raised such that the user can comfortably observe the melting of the wax stick without having to bend down. Additionally or alternatively, a user may wish to view the melted portions of the wax stick as it drips out of the tip 53. The support element 48 may be raised or lowered accordingly. Furthermore, the support element 48 may be repositioned in order to vary the design pattern that is created. In embodiments, the support element 48 may be automatically repositioned during the melting and spinning cycle in order to automatically provide such variations. In embodiments, the device 10 is configured such that the support element 48, and the melting component 46 that may be coupled thereto, is separated from the bottom surface 18 of the first compartment 11 by at least a threshold distance. Such configuration may be related to the safety concerns discussed above.

As mentioned, after processing at the melting component 46, melted portions of the wax stick, such as droplets of melted wax, may be transferred from the tip 53 of the nozzle 52 to the third compartment 14 through the second compartment opening 56. A gravitational pull may assist such a transfer. Additionally or alternatively, an acceleration mechanism may provide an increased rate of transfer from the tip 53 of the nozzle 52 to the third compartment 14. The second compartment opening 56 may be configured to allow the transfer of melted portions of the wax stick to the third compartment 14 and/or to enable a user to view at least a portion of the spinning component included in the third compartment 14. The size of the second compartment opening 56 may be optimized based on providing a view of the spinning component and/or preventing the melted portions of the wax stick from splattering back into the second compartment 12.

Turning briefly now to the third compartment 14, which will be discussed in greater detail with respect to FIGS. 3-5, embodiments of the third compartment 14 may be repositionable with respect to the first compartment 11 and the second compartment 12. In embodiments, the third compartment 14 is repositionable along the axis x with respect to the first compartment 11 and the second compartment 12. For example, the third compartment 14 may be slidably repositionable. In embodiments, the third compartment 14 may be a drawer. Other means of repositioning the third compartment 14 are included within the scope of this invention.

A speed control component 58 may be provided to control a speed associated with a spinning component housed in the third compartment 14. A second lighting component 57 may indicate a state of the third compartment 14. The spinning component housed in the third compartment 14, as well as the speed control component 58 and the second lighting component 57, will be discussed in greater detail with respect to FIGS. 3-5.

As illustrated in FIG. 1, in embodiments, the first compartment 11 and the second compartment 12 are characterized by a cylindrical configuration. The first compartment 11 may have a top surface 16 and a bottom surface 18, and the second compartment 12 may have a top surface 20 and a bottom surface 22. Also, as illustrated in FIG. 1, the first compartment 11 and the second compartment 12 may be positioned directly adjacent to one another, while the second compartment 12 and the third compartment 14 may be adjacent to one another, but may be separated by some other surface or element such that the two are not directly adjacent to one another. With respect to the directly adjacent positioning of the first compartment 11 and the second compartment 12, a bottom surface 18 of the first compartment 11 may be coupled to a top surface 20 of the second compartment 12. In embodiments, the bottom surface 18 of the first compartment 11 and the top surface 20 of the second compartment 12 are surfaces of the same element. FIG. 1 illustrates an exemplary embodiment of the device 10 in which the first compartment 11 and the second compartment 12 are vertically adjacent to one another, but in further embodiments, the first compartment 11 and the second compartment 12 may be aligned in other configurations, such as a horizontal, diagonal, or other alignment. For example, if the first compartment 11 and the second compartment 12 are horizontally adjacent to one another, a wax stick may be transferred from the channel 26 through the channel opening 27 via an advancing mechanism, such as an advancing mechanism coupled to a source of compressed air, such that the wax stick travels along a horizontal path to the nozzle opening 42. Similarly, any number of configurations and/or manners of alignment is contemplated as falling within the scope of the present invention.

It will be understood that although FIG. 1 illustrates a single channel 26 and a single nozzle opening 42, embodiments of the present invention may be configured for use with any number of wax sticks. Thus, embodiments of the device 10 may include one or more channels and a corresponding number of nozzles and/or nozzle openings at a melting component. Additionally, in some embodiments, a single channel, such as channel 26, may be configured to receive multiple wax sticks. The multiple wax sticks may be received, dropped, and melted one at a time, or the channel may be configured to receive multiple wax sticks for releasing into the melting component.

Figure 3:
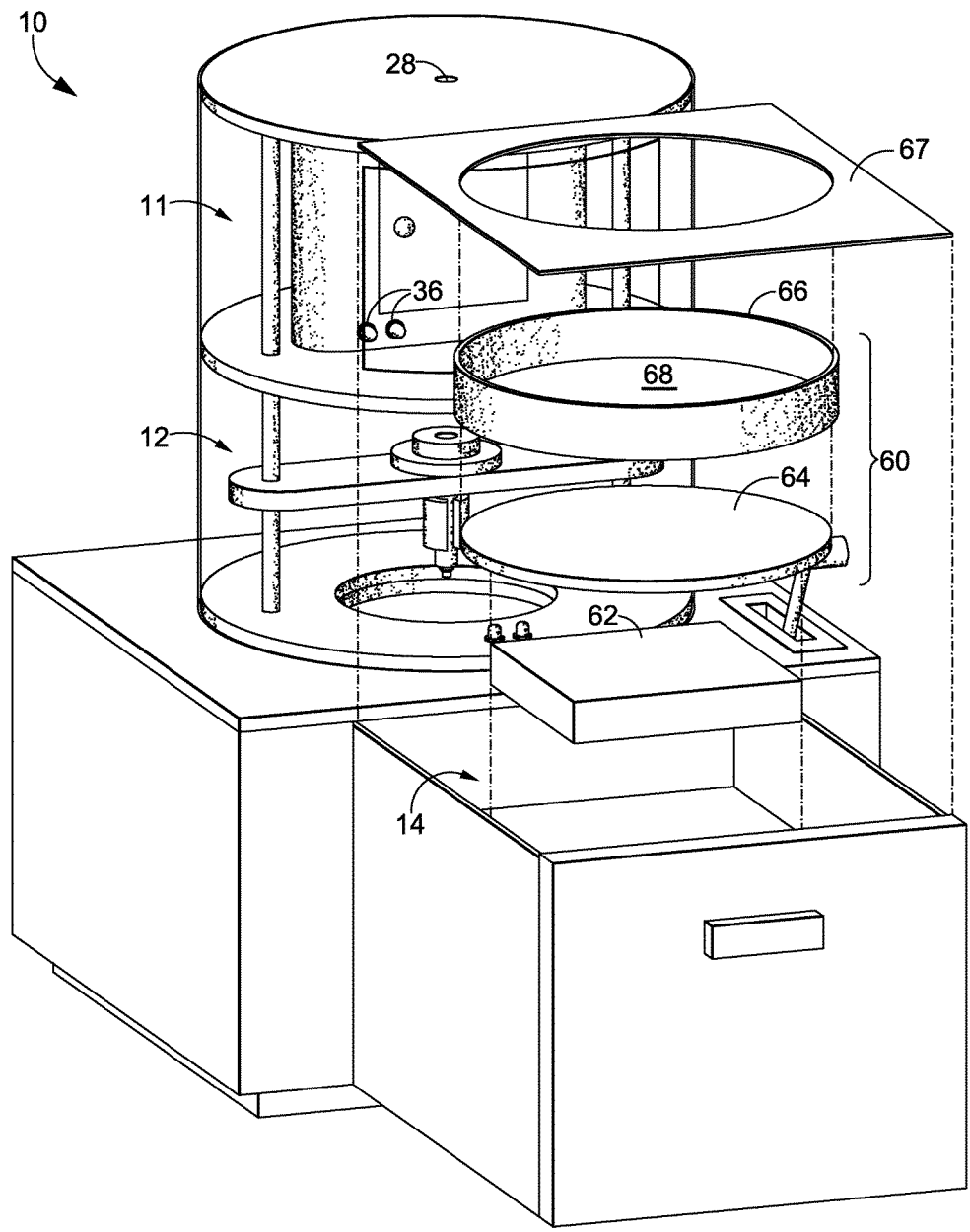
FIG. 3 is a front perspective view of a melting and spinning device with a third compartment of the device in an open position, and an exploded view of the components included in the third compartment, in accordance with an embodiment of the present invention.

Turning now to FIG. 3, a front perspective view of an embodiment of the device 10 with the third compartment 14 in an open position is illustrated, as well as an exploded view of the components that may be included in the third compartment 14, in accordance with an embodiment of the present invention. As mentioned, in embodiments, the third compartment 14 is slidably repositionable with respect to the first compartment 11 and the second compartment 12. In FIG. 3, the third compartment 14 has been slidably repositioned to an open position, such that the interior of the third compartment 14 is accessible to a user. In embodiments, the third compartment 14 houses a spinning component 60 that is coupled to a removable motor component 62. The spinning component 60 may include a spinning mechanism 64 that is removably coupled to a tray 66. The third compartment 14 may further include a removable cover 67 that fits over and/or around the tray 66. The tray 66 is an optional component. The design surface may be positioned directly on the spinning mechanism 64.

Embodiments of the tray 66 may receive a design surface, such as paper, wax paper, or any other artistic medium, at a bottom surface 68 of the tray 66 or simply on a surface of the spinning mechanism 64 without the tray 66. For example, a user may slide open the third compartment 14 and place a piece of paper on the bottom surface 68 of the tray 66 or on the spinning mechanism 64. In embodiments, the tray 66 is a round tray having a raised rim, such as a round cake pan. The artistic medium provided for use with the device 10 may be customized to the size and/or shape of the tray 66 or the spinning mechanism 64, such that the size and/or shape of the artistic medium matches the size and/or shape of the bottom surface 68 of the tray 66 or the spinning mechanism 64. In this way, the design surface may be secured in the third compartment 14 by the tray 66. The spinning mechanism 64 may include a mount or holder to receive and hold various design surfaces in place on the spinning mechanism 64.

The spinning mechanism 64 may be coupled to the motor component 62 such that the motor component 62 drives the spinning mechanism 64. The motor component 62 may thus cause the spinning component 60 to spin. In embodiments, the motor component 62 may be directly coupled to the spinning mechanism 64, such that the motor component 62 directly drives the spinning mechanism 64. In further embodiments, the motor component 62 may be indirectly coupled to the spinning mechanism 64, such as by magnets. In either case, the spinning mechanism 64 may be removably coupled to the motor component 62, thereby enabling the spinning mechanism 64 to be easily removed from the motor component 62. As the motor component 62 causes the spinning mechanism 64 to spin, the spinning mechanism 64 may cause the tray 66, which may be removably coupled to the spinning mechanism 64, to spin. In embodiments, the spinning mechanism 64 is a turn table. For example, the turn table may include magnets that hold a metal tray 66 in place as the spinning mechanism 64 spins.

Figure 4:
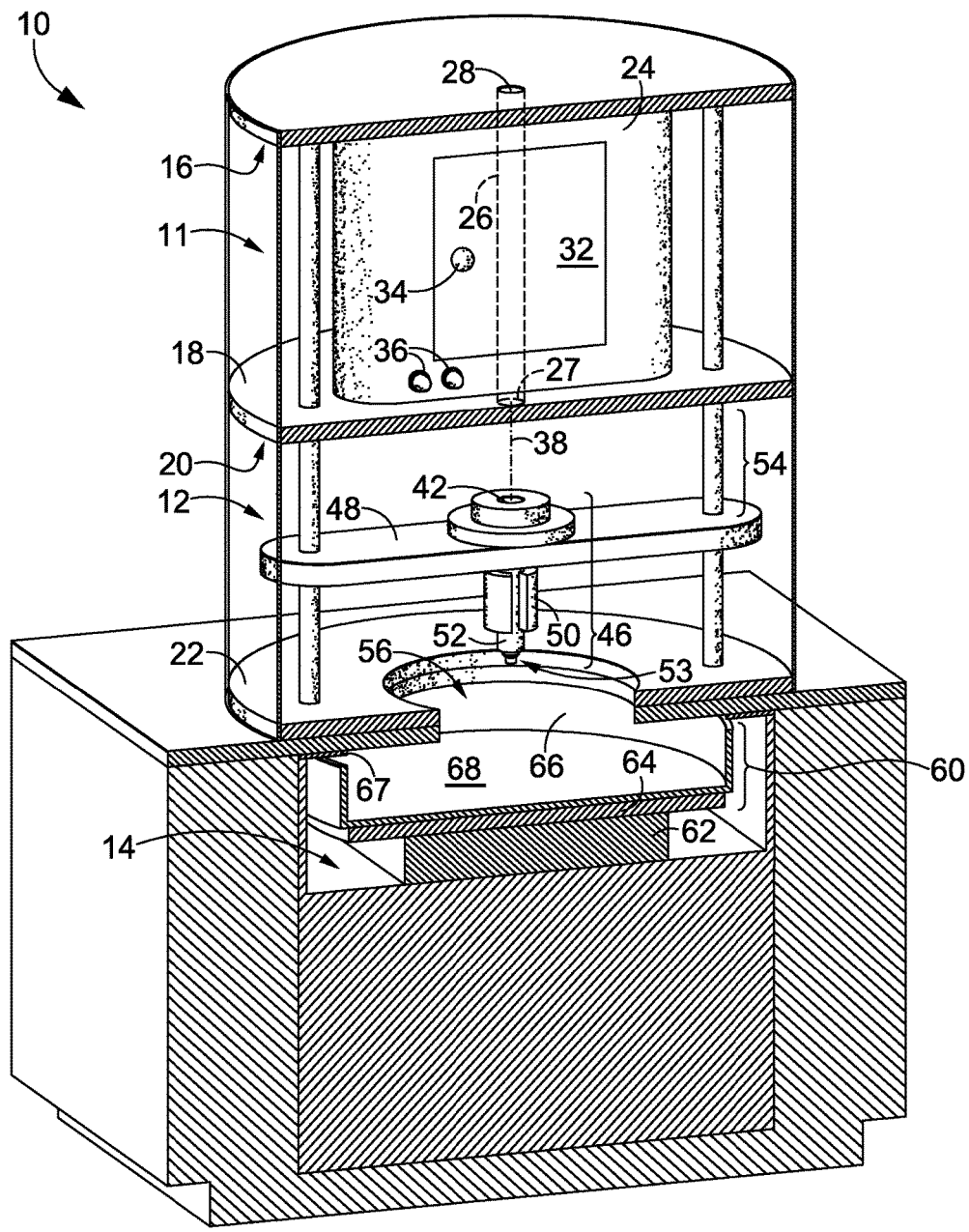
FIG. 4 is a cross-sectional view of a melting and spinning device, in accordance with an embodiment of the present invention.

Turning now to FIG. 4, a cross-sectional view of the device 10 is provided, in accordance with an embodiment of the invention. As shown in FIG. 4, the nozzle 52 may be aligned with the bottom surface 68 of the tray 66 when the third compartment 14 is in a closed position. In embodiments, the nozzle 52 is aligned with a center portion of the tray 66, such as the center of the tray 66. Thus, when melted portions of the wax stick, such as droplets of melted wax, are transferred from the nozzle 52 of the melting component 46 through the second compartment opening 56 to the third compartment 14, the droplets may fall on a design surface provided at the bottom surface 68 of the tray 66. The motor component 62 may cause the spinning mechanism 64 to spin, which in turn may cause the tray 66 including the design surface to spin. When the melted droplets of wax hit the spinning design surface, the melted droplets of wax may be dispersed in a radial direction. Such dispersion may create a radial design pattern, such as a spinning, spiraling, swirling, splattering, exploding, or other design pattern, of melted wax. Furthermore, multiple colors of wax sticks may be used to create a multi-colored radial design pattern. The spinning component 60 may automatically begin spinning when a user closes the cover 32 and/or closes the third compartment 14. The spinning component 60 may begin spinning at a slow, steady speed. Such speed may be maintained, or the speed may be automatically and/or manually varied in order to produce variations in the radial design pattern. As mentioned, the support element 48 may also be automatically and/or manually repositioned to produce variations in the design pattern.

In embodiments, a speed control component 58 may be used to manually adjust a variable speed at which the motor component 62 causes the spinning component 60 to spin. For example, the speed control component 58 may be a lever, such as a throttle, that a user can move in order to adjust a speed of rotation at the spinning component 60. The user may thus increase or decrease the speed at which the spinning component 60 spins, and thereby adjust the speed at which the design surface spins.

In embodiments, a removable cover 67 is included in the third compartment 14 and fits over and/or around the tray 66, or if no tray is included, around and/or over the spinning mechanism 64. For example, a size of a hole in the removable cover 67 may be configured such that the hole fits around the tray 66. The hole may be approximately the same size as the tray 66. In embodiments, the removable cover 67 is a PVC cover. The removable cover 67 may be held in place in the third compartment 14 by a magnet or any other means for preventing the removable cover 67 from slipping, sliding, or otherwise moving while the device 10 is in use. The removable cover 67 may act as a splatter guard, such that any melted wax that is dispersed outside of the perimeter of the tray 66 falls on the splatter guard, rather than on the spinning mechanism 64 or the motor component 62. If, however, a particular component requires cleaning, maintenance, and/or replacement, the device 10 is configured to provide easy access to at least the components housed in the third compartment 14. For example, the tray 66 may be removably coupled to the spinning mechanism 64, which may be removably coupled to the motor component 62. Furthermore, the motor component 62 may be removable, such that it may be removed from the third compartment 14. Thus, each of the motor component 62, the spinning mechanism 64, and the tray 66 may be removed from the surrounding components for cleaning, maintenance, and/or replacement.

Additionally, because embodiments of the third compartment 14 may be moveable and/or repositionable, it may easily be accessed without disturbing the remainder of the device 10. For example, if the motor component 62 needs to be replaced, then in embodiments, a maintenance operator need merely open the third compartment 14, remove the spinning component 60 from the third compartment 14 and disconnect the spinning component 60 from the motor component 62, and then remove the motor component 62 from the third compartment 14. The motor component 62 may then be cleaned, repaired, and/or replaced, as needed. In embodiments, the third compartment 14 additionally includes another access point, such as a door, through which a maintenance operator may further access various components.

Figure 5:
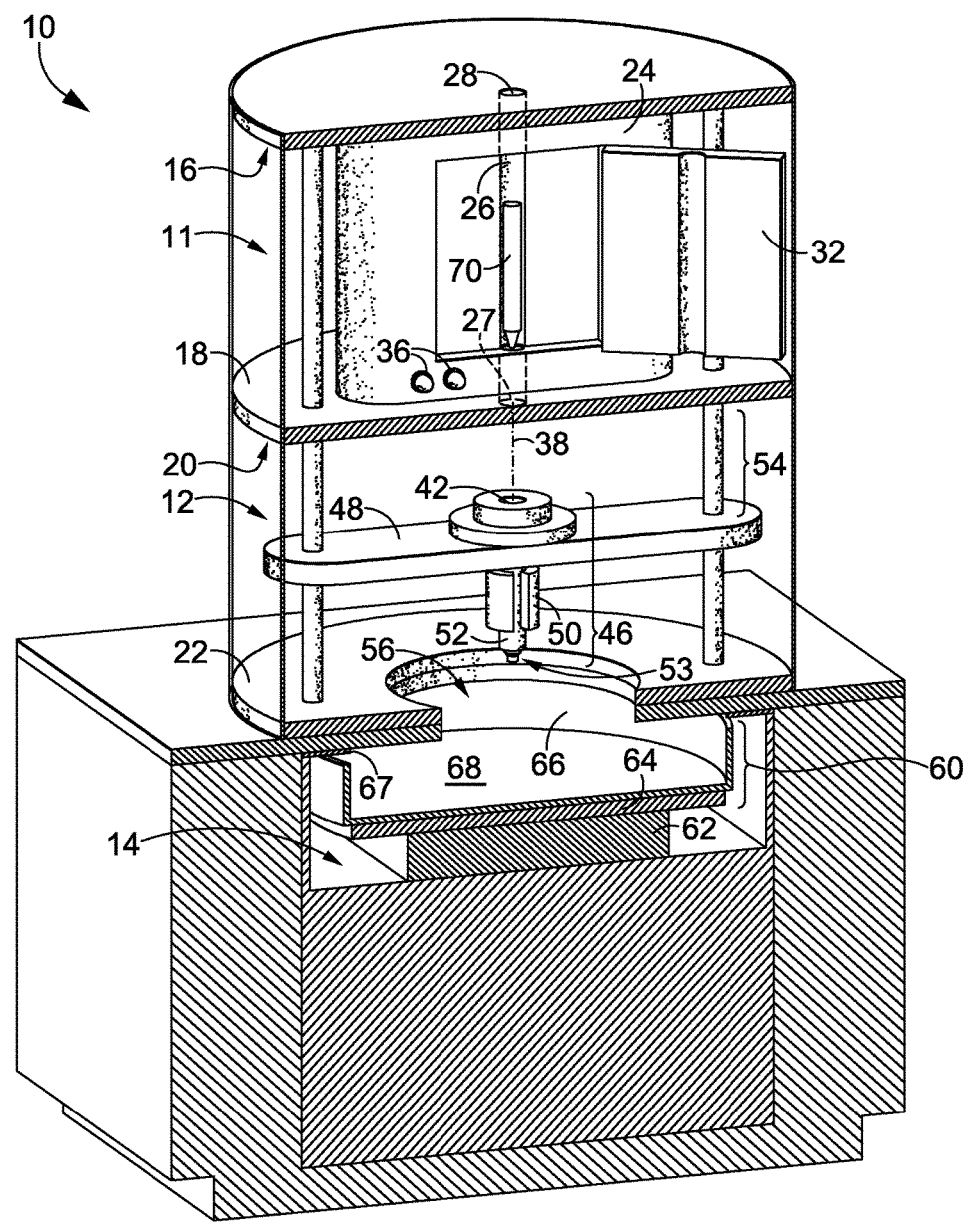
FIG. 5 is a cross-sectional view of a melting and spinning device having a cover on a receiving and positioning component, the cover in an open position, in accordance with an embodiment of the present invention.

FIG. 5 provides an additional cross-sectional view of the device 10, in accordance with an embodiment of the invention. In FIG. 5, the cover 32 of the receiving and positioning component 24 is in an open position. Additionally, a wax stick 70 is positioned in the channel 26 with a tip of the wax stick 70 pointing in a downward direction, or rather, towards the second compartment 12.

The device 10 may be configured to provide a safe and intuitive user experience such that a wide variety of users, including small children, can interact with the device 10 with minimal assistance and adequate safety. The lighting components associated with the device 10 may assist in creating this safe and intuitive user experience. The first lighting component 36 was discussed above with respect to FIG. 1. As mentioned, the second lighting component 57, which is illustrated in FIG. 1 but not visible in the cross-sectional view of FIG. 5, may indicate a state of the third compartment 14. Such states may include a locked and unlocked state. An electromagnetic lock, such as that described with respect to the lock on the cover 32, may be used to implement the locked and unlocked states of the third compartment 14. With respect to the second lighting component 57, in embodiments, a green light may indicate that the third compartment 14 is unlocked and ready to receive a design surface. A red light may indicate that the melting and spinning process is in progress, and that the third compartment 14 is therefore locked. As discussed with respect to the first lighting component 36, the second lighting component 57 may include one or more lighting elements that may or may not be configured to display various colors. The lighting elements of the second lighting component 57 may include LED lights or any other light source for illuminating at least a portion of the second lighting component 57.

The first lighting component 36 and the second lighting component 57 may be used to indicate an order of operations to a user and ensure an efficient flow of user traffic at the device 10. This intuitive user experience and level of efficiency may be important when the device 10 is integrated into an exhibit or experience that is visited by a high volume of users, as efficiency will contribute to a high quality of user experience.

An exemplary order of operations at the device 10 may be as follows. A user may approach the device 10. The first lighting component 36 may be red, indicating that the cover 32 of the receiving and positioning component 24 is locked. A green light at the second lighting component 57 may indicate that the third compartment 14 is unlocked, and that a user should begin by opening the third compartment 14. The user may then open the third compartment 14, place a design surface at the bottom surface 68 of the tray 66 or on the spinning component 64, and close the third compartment 14. Upon closing the third compartment 14, a lock associated with the third compartment 14 may engage. The second lighting component 57 may then display a red light to indicate that the third compartment 14 is locked and may not be opened until the current melting and spinning process is complete. Upon closing the third compartment 14, the first lighting component 36 may display a green light, indicating that the cover 32 of the receiving and positioning component 24 is unlocked, and that the user should open the cover 32. The user may then open the cover 32 of the receiving and positioning component 24 and place a wax stick 70, such as an unwrapped crayon (e.g., an unwrapped Crayola® crayon), into the channel 26. The user may then close the cover 32. Upon closing the cover 32, a lock associated with the cover 32 may engage. The first lighting component 36 may display a red light to indicate that the cover 32 is locked and may not be opened until the current melting and spinning cycle is complete. When the cover 32 is closed, the spinning component 60 may automatically begin to spin. The user may then watch the melting and spinning process, and may interact with the device 10 via the speed control component 58 illustrated in FIG. 1 and/or by repositioning the support element 48, but the user may not open either the third compartment 14 or the cover 32. After a predetermined amount of time, spinning component 60 may stop spinning, the lock on the third compartment 14 may disengage, and the second lighting component 57 may display a green light to indicate that the user may open the third compartment 14 and retrieve the design surface featuring the wax design. The predetermined amount of time may be based on an amount of time associated with melting, dripping, and spinning, as well as an amount of time for allowing the melted wax to cool on the design surface. In this way, a release component may be coupled to the third compartment 14, where the release component is configured to activate or deactivate, such as locking or unlocking a lock, in response to a timing mechanism. In embodiments, the predetermined amount of time is approximately 60-90 seconds, with the unlocking of the lock comprising releasing of a drawer coupled to the third compartment 14.

If the user wishes to engage in an additional cycle at the device 10, such as by providing a second wax stick having a different color from the first wax stick, the user may open and close the third compartment 14 to begin a new cycle. The user may choose to leave the original design surface in place in order to create a multi-colored design, or may remove the original design surface from the tray 66 and replace it with a new design surface. As described above, upon closing the third compartment 14, the lock associated with the third compartment 14 may engage and the second lighting component 57 may display a red light. The first lighting component 36 may display a green light, indicating the cover 32 is unlocked. The cycle may continue as described above. At the end of the second cycle, the user may remove his design surface from the third compartment 14.

When the next user approaches the device 10, a green light at the second lighting component 57 may indicate that the user should begin by placing a design surface at the bottom surface 68 of the tray 66. The locking and lighting sequence associated with a cycle at the device 10 may then continue as described above.

The exemplary order of operations described above may not only promote efficiency, but may also promote safety and proper use of the device 10. For example, the locking and unlocking sequence described above may prevent a user from providing multiple wax sticks to the channel 26 during the melting and spinning process. This may prevent a jam of wax sticks in the channel 26 or other portions of the device 10. This may also control the time a single user may spend at the device 10, as the user may be limited to interacting with a number of cycles corresponding to a number of wax sticks provided to the user. Additionally, if the user is required to open the third compartment 14 before a lock on the cover 32 is disengaged, a user is encouraged to remove his design surface and move on to another exhibit or display area, rather than leaving his design surface in the third compartment 14 and interacting with an additional cycle of the melting and spinning process.

It will be understood that the order of operations and associated locking, unlocking, and lighting schemes described above are exemplary only. Other schemes may be implemented at the device 10 using the locks and lighting components. It will further be understood that the device 10 may include components in addition to those described above, or that the device 10 may include fewer components than those described above.

Figure 6:
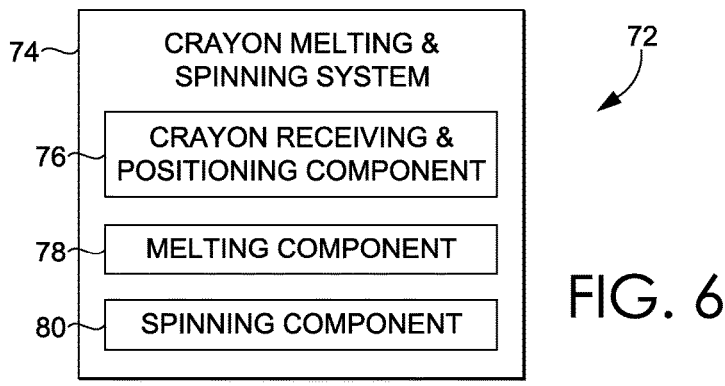
FIG. 6 is a block diagram of an exemplary system for creating a design on a design surface, in accordance with an embodiment of the present invention.

Turning now to FIG. 6, an exemplary environment 72 in which embodiments of the present invention may be implemented is described below. The environment 72 may include a crayon melting and spinning system 74 that may be used to create a design on a design surface. The system 74 may include a receiving and positioning component 76 for receiving and positioning one or more wax sticks. In embodiments, the receiving and positioning component 76 provides functionality similar to that provided by the receiving and positioning component 24 of FIGS. 1-5. The system 74 further includes a melting component 78 for melting the one or more wax sticks. In embodiments, the melting component 78 provides functionality similar to that provided by the melting component 46 of FIGS. 1-5. Finally, the system 74 includes a spinning component 80 for spinning a design surface that receives the melted one or more wax sticks. In embodiments, the spinning component 80 provides functionality similar to that provided by the spinning component 60 of FIGS. 1-5.

Figure 7:
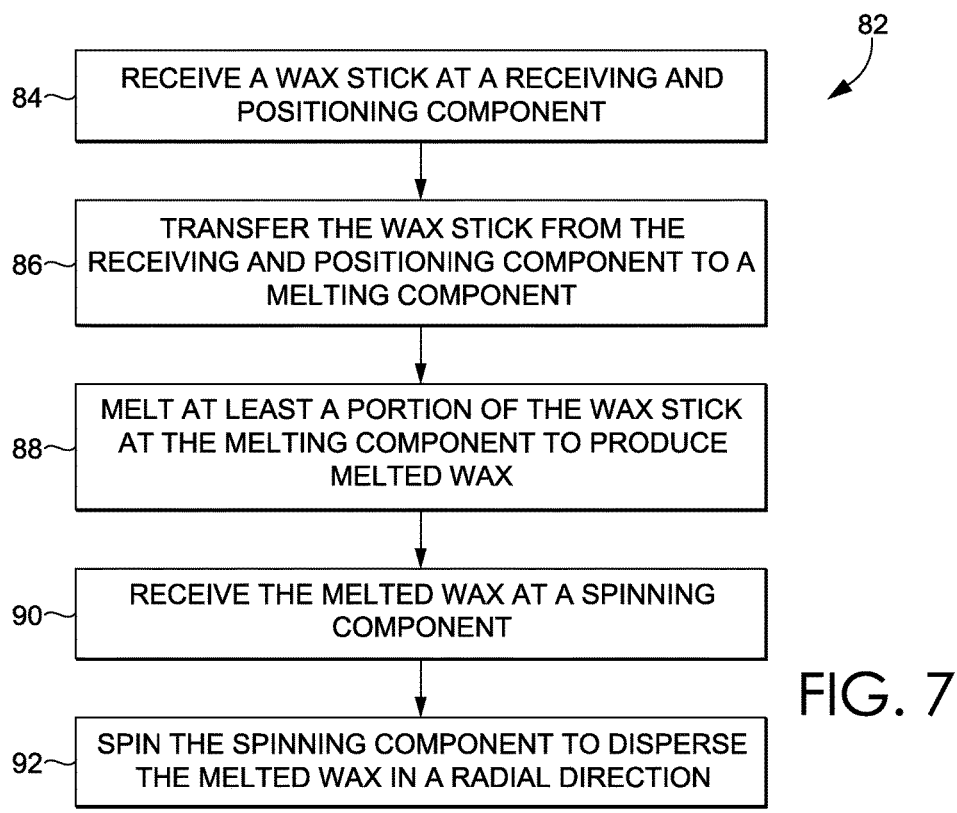
FIG. 7 is an exemplary flow diagram including steps for creating a design on a design surface, in accordance with an embodiment of the present invention.

FIG. 7 provides an exemplary flow diagram 82 including steps for creating a design on a surface. At block 84, a wax stick is received at a receiving and positioning component, such as the receiving and positioning component 24 of FIGS. 1-5. At block 86, the wax stick is transferred from the receiving and positioning component to a melting component, such as the melting component 46 of FIGS. 1-5 at step 86. At block 88, the wax stick is melted at the melting component to produce melted wax. At block 90, the melted wax is received at a spinning component, such as the spinning component 60 of FIGS. 1-5. Finally, at block 92, a spinning component is spun in order to disperse the melted wax in a radial direction.

Figure 8:
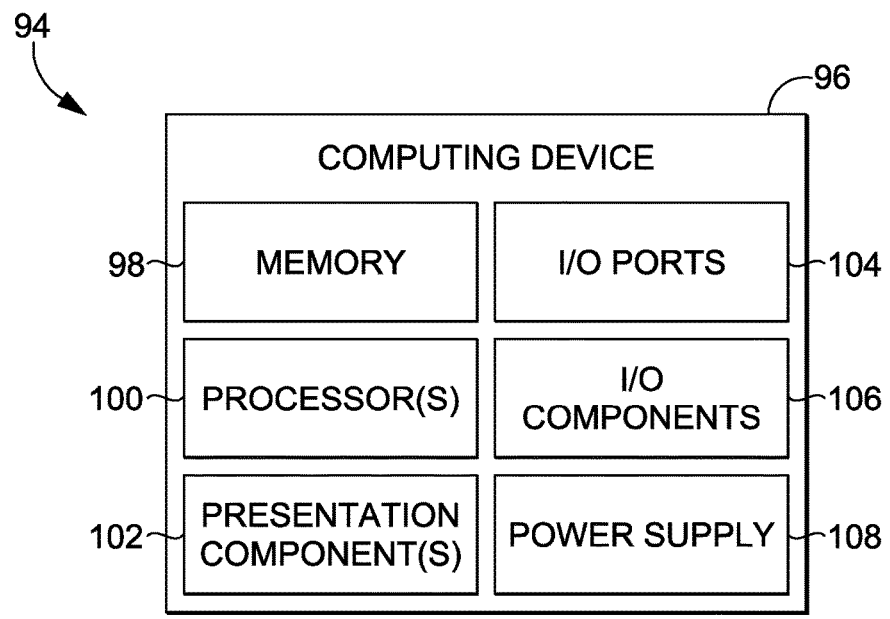
FIG. 8 is an exemplary computing device for use with a melting and spinning device, in accordance with an embodiment of the present invention.

Referring finally to FIG. 8, an exemplary operating environment 94 in which embodiments of the present invention may be implemented is described below to provide a general context for various aspects of the present invention. Exemplary operating environment 94 includes a computing device 96, which is but one example of a computing environment for use with the present invention. The computing device 96 is not intended to suggest any limitation as to the scope of use or functionality of embodiments of the invention, and should not be interpreted as having any dependency or requirement relating to any one component nor any combination of components illustrated. In embodiments, the computing device 96 is coupled to the device 10 of FIG. 1 to provide various features discussed with respect to FIGS. 1-7.

Embodiments of the invention may be described in the general context of computer code or machine-useable instructions, including computer-useable or computer-executable instructions such as program modules, being executed by the computing device 96. The computing device 96 typically includes a variety of computer-readable media, which may be any available media that is accessible by the computing device 96, such as computer storage media that stores computer-executable instructions for execution by the computing device 96.

As shown in the example of FIG. 8, the computing device 96 may include the following components: a memory 98, one or more processors 100, one or more presentation components 102, one or more input/output (I/O) ports 104, one or more I/O components 106, and an illustrative power supply 108. The power supply 108 might include a rechargeable battery. As will be understood, the components of exemplary computing device 96 may be used in connection with one or more embodiments of the invention. In embodiments, computing device 96 may include fewer components than those depicted in FIG. 8, or other components in addition to those depicted in FIG. 8.

Embodiments of the memory 98 include computer storage media in the form of volatile and/or nonvolatile memory that may be removable, non-removable, or a combination thereof. The computing device 96 may also include one or more processors 100 that read data from various entities such as the memory 98 or the I/O components 106. The presentation component(s) 102 may be configured to present data indications to a user or other device, such as a display device, speaker, printing component, vibrating component, lighting component, and the like. In further embodiments, the I/O ports 104 allow the computing device 96 to be logically coupled to other devices, while the I/O components 106 may include a camera, touch screen, microphone, joystick, game pad, satellite dish, scanner, printer, wireless device, a controller such as a stylus, a keyboard, and a mouse, a natural user interface (NUI), and the like.

The I/O components 106 may include a temperature sensing and/or temperature control component for sensing and/or controlling a temperature of the heating element 50 of FIGS. 1-5. For example, the rheostat and/or temperature controller discussed above may be one such I/O component. The I/O components may further include the speed control component 58 of FIGS. 1-5.

The processor 100 may be used to perform a variety of functions discussed with respect to FIGS. 1-7 including implementing a program for temperature control, implementing a locking and unlocking scheme such as that discussed above, implementing a lighting scheme such as that discussed above, activating or deactivating a release component at one or more of the compartments in response to a timing mechanism as discussed above, activating or deactivating a releasing mechanism for the wax stick as discussed above, implementing the variable speed control as discussed above, or any other number of features. A reset button may be provided to reset the computing device 96 in the event the computing device 96 freezes and/or malfunctions.

Figure 9A:
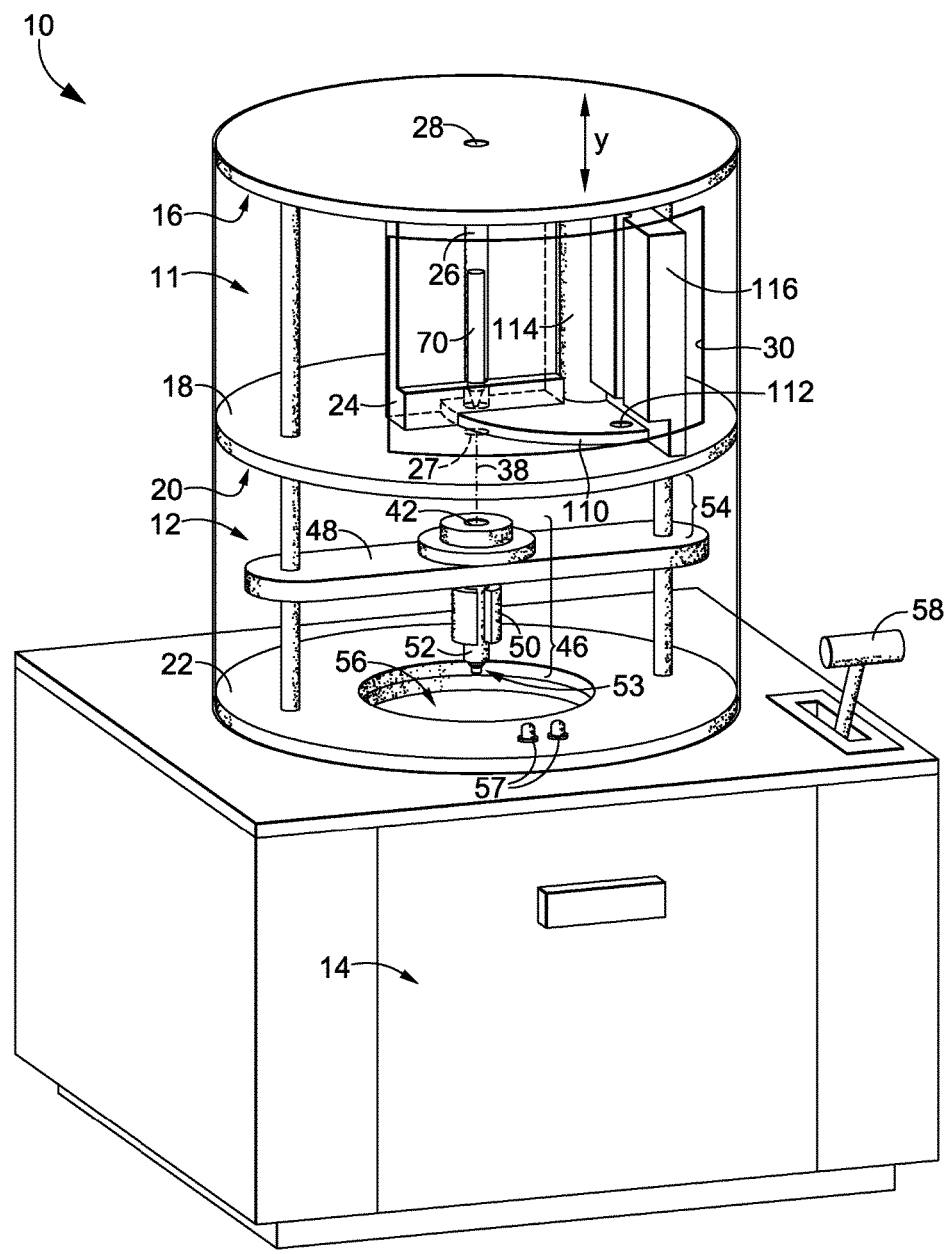
FIG. 9A is a front perspective view of a melting and spinning device having a cover in an open position, in accordance with an embodiment of the present invention.
Figure 9B:
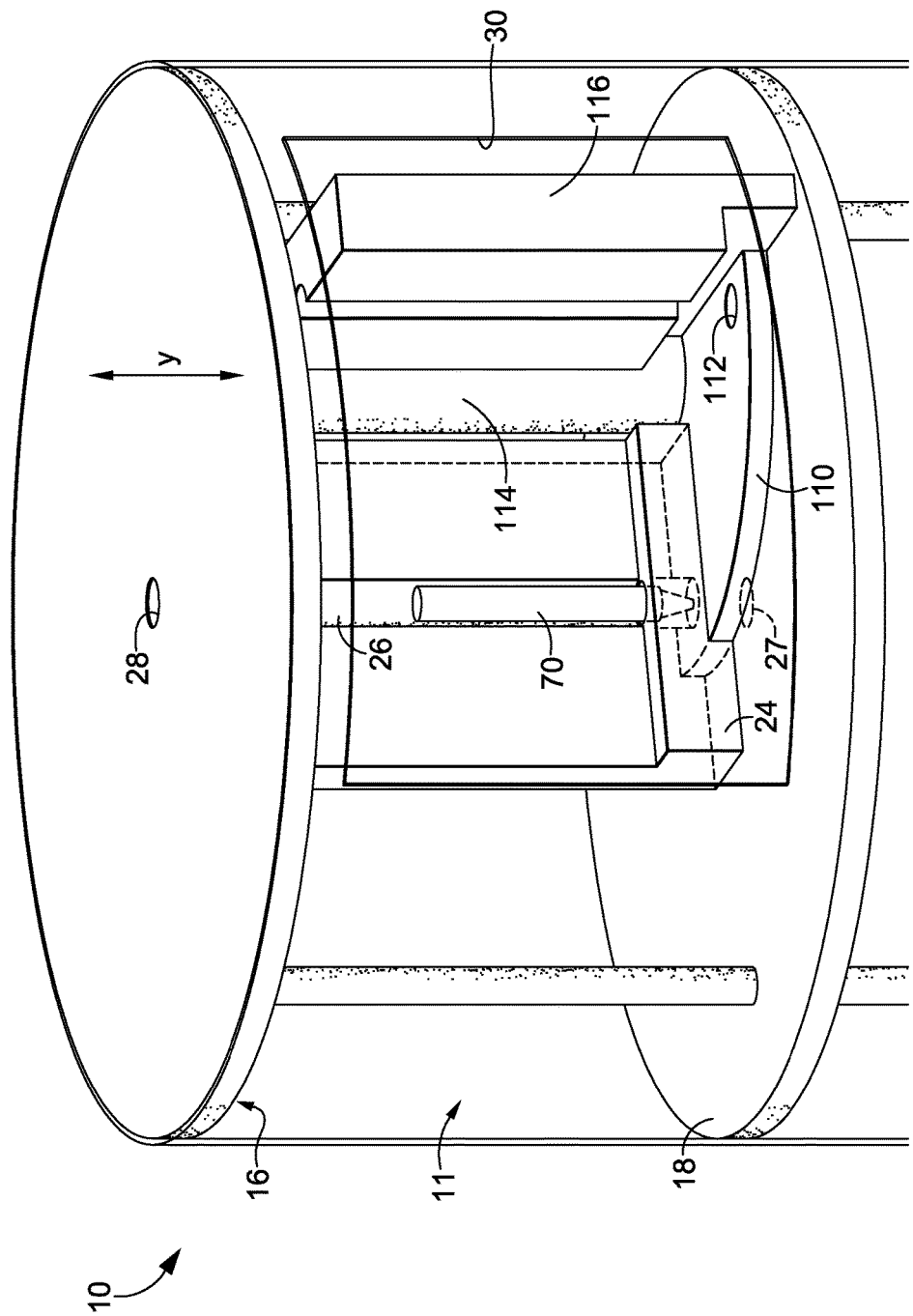
FIG. 9B is an enlarged front perspective view of the melting and spinning device of FIG. 9A with the cover in an open position, in accordance with an embodiment of the present invention.

In FIGS. 9A-9B, additional views of the device 10 are provided in accordance with an embodiment of the invention. As shown in FIGS. 9A-9B, a wax stick 70 is positioned in the channel 26 of the receiving and positioning component 24 with a tip of the wax stick 70 pointing in a downward direction. A covering component 116 may be coupled to a pivoting column 114. The covering component 116 and the pivoting column 114 may be adjacent and/or directly adjacent to the receiving and positioning component 24. In embodiments, the pivoting column 114 is separated from the receiving and positioning component 24 by a predefined amount of space. The pivoting column 114 and the covering component 116 coupled thereto may be rotatably repositioned with respect to the receiving and positioning component 24. For example, the covering component 116 may be rotatably repositionable about an axis y. In embodiments, the axis y corresponds to a central longitudinal axis running through a center of the pivoting column 114. The covering component 116 may be rotatably repositioned between at least a first and second position, corresponding to an open and closed position, respectively. For example, FIGS. 9A-9B illustrate the covering component 116 in an open position, such that a wax stick 70 may be provided to the channel 26 of the receiving and positioning component 24.

In embodiments, when the covering component 116 is in a closed position, the covering component 116 is directly adjacent to the receiving and positioning component 24.

The pivoting column 114 and/or the covering component 116 may further be coupled to a drop plate 110, which may also be rotatably repositionable with respect to the receiving and positioning component 24. For example, if the drop plate 110 is coupled to the covering component 116, then as the covering component 116 is rotated about the axis y, the drop plate 110 will also rotate about the axis y. As illustrated in the example of FIGS. 9A-9B, the drop plate 110 is arc shaped, in embodiments.

In further embodiments, the drop plate 110 facilitates a timing of the transfer of the wax stick 70 from the first compartment 11 to the second compartment 12. For example, the drop plate 110 may include a drop plate opening 112. As the covering component 116 is rotated about the axis y, the drop plate 110, and consequently the drop plate opening 112, may also rotate about the axis y. The drop plate opening 112 may be configured such that when the covering component 116 is in a closed position, the drop plate opening 112 is directly aligned with the channel 26 and the channel opening 27, thereby allowing the wax stick 70 to be transferred out of the channel 26 and into the second compartment 12 of the device 10. When the covering component 116 is in an open position, however, as illustrated in FIGS. 9A-9B, a portion of the drop plate 110 may obstruct the channel opening 27, thereby preventing the transfer of the wax stick 70. In this way, the drop plate 110 may act as a releasing mechanism, in embodiments, preventing the transfer of the wax stick 70 from the first compartment 11 to the second compartment 12 when the covering component 116 is in an open position, while allowing the transfer of the wax stick 70 when the covering component 116 is in a closed position. As such, a user may reposition the covering component 116 to an open position, and then provide the wax stick 70 to the channel 26. A tip of the wax stick 70 may rest on the drop plate 110 as long as the covering component 116 is in an open position, as illustrated in FIGS. 9A-9B. Then, upon repositioning the covering component 116 to a closed position, and thereby causing the drop plate opening 112 to be directly aligned with the channel 26 and the channel opening 27, the wax stick 70 may be transferred from the channel 26 to the melting component 46. The dropping of the wax stick may further be controlled by a temperature-based releasing mechanism, which, when the correct temperature has been reached at the nozzle, allows the wax stick to drop so that the nozzle is the correct temperature when the wax stick is inserted.

While FIGS. 9A-9B illustrate a rotatably repositionable covering component 116 and drop plate 110, it should be understood that in further embodiments the covering component 116 and/or the drop plate 110 may be slidably repositionable, repositionable via hinges, or any other configuration that allows the covering component 116 and/or the drop plate 110 to be repositioned between at least a first position and a second position, where the first position allows a user to access the channel 26 (but prevents the wax stick 70 from falling through the channel opening 27) and the second position prevents the user from accessing the channel 26 (but allows the wax stick 70 to fall through the channel opening 27, assuming any temperature-based releasing mechanism is also aligned to let the wax stick fall).

Figure 10:
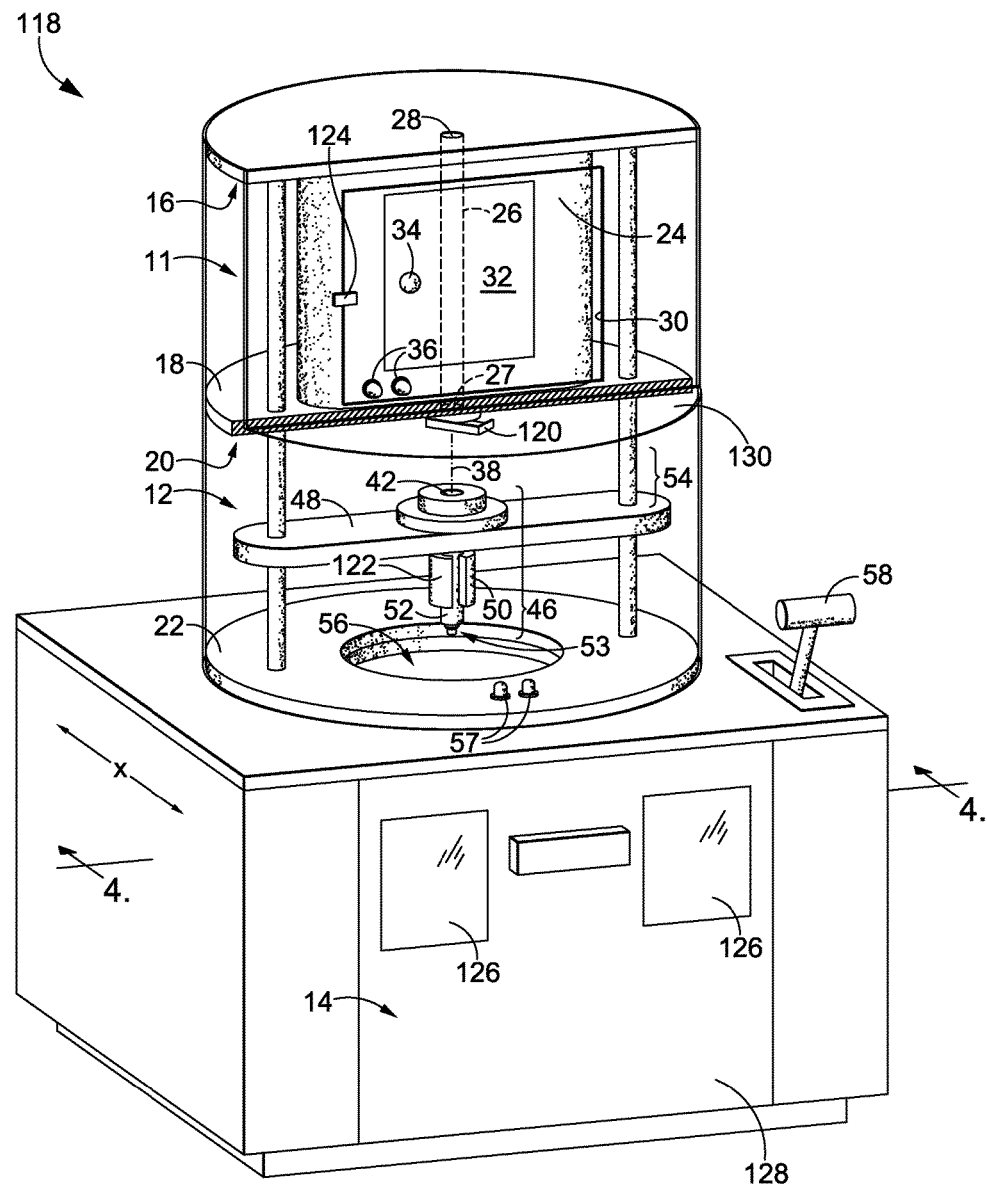
FIG. 10 is a front perspective view of a melting and spinning device with a third compartment of the device in a closed position and the first compartment offset from the second compartment, in accordance with an embodiment of the present invention.

In the exemplary embodiment of FIG. 10, a melting and spinning device 118 having additional features is shown, in accordance with an embodiment of the present invention. In FIG. 10, the device 118 is depicted with one or more elements described above in relation to FIG. 1. Additionally, the device 118 includes a releasing mechanism 120 (e.g., a travel stop). Embodiments of the releasing mechanism 120 may be configured to prevent movement of a wax stick from the channel 27 to the nozzle 52 until the nozzle 52 has reached a desired temperature and the releasing mechanism 120 is activated. In this regard, a temperature measuring element 122 may indicate when the correct temperature has been reached at the nozzle 52 for melting a wax stick, and subsequently, the releasing mechanism 120 may be activated, manually or automatically, to release the wax stick into the nozzle 52. Additionally, a latching mechanism 124 may be coupled to the cover 32 for securing the cover 32 when the device 118 is in operation. As such, the device 118 may further include windows 126 on a drawer 128 coupled to the third compartment 14, to provide viewing access to the third compartment 14 during the spinning process. In embodiments, part or all of the device 118, including any of the first, second, and third compartments 11, 12, and 14, may be formed from see-through polymer material, glass, Plexiglas, or other see-through materials to allow viewing of the melting and spinning process during operation of the device 118, even though the second compartment 12 remains inaccessible to a user during operation. In further regards to the visibility of the heating and spinning process, the device 118 may include a first compartment 11 being offset from the second compartment 12, providing a flat, exposed, and see-through surface 130 on a top surface of the second compartment 12 through which a user can view a melting and spinning process in the device 118, according to one embodiment of the invention.

Figure 11A:
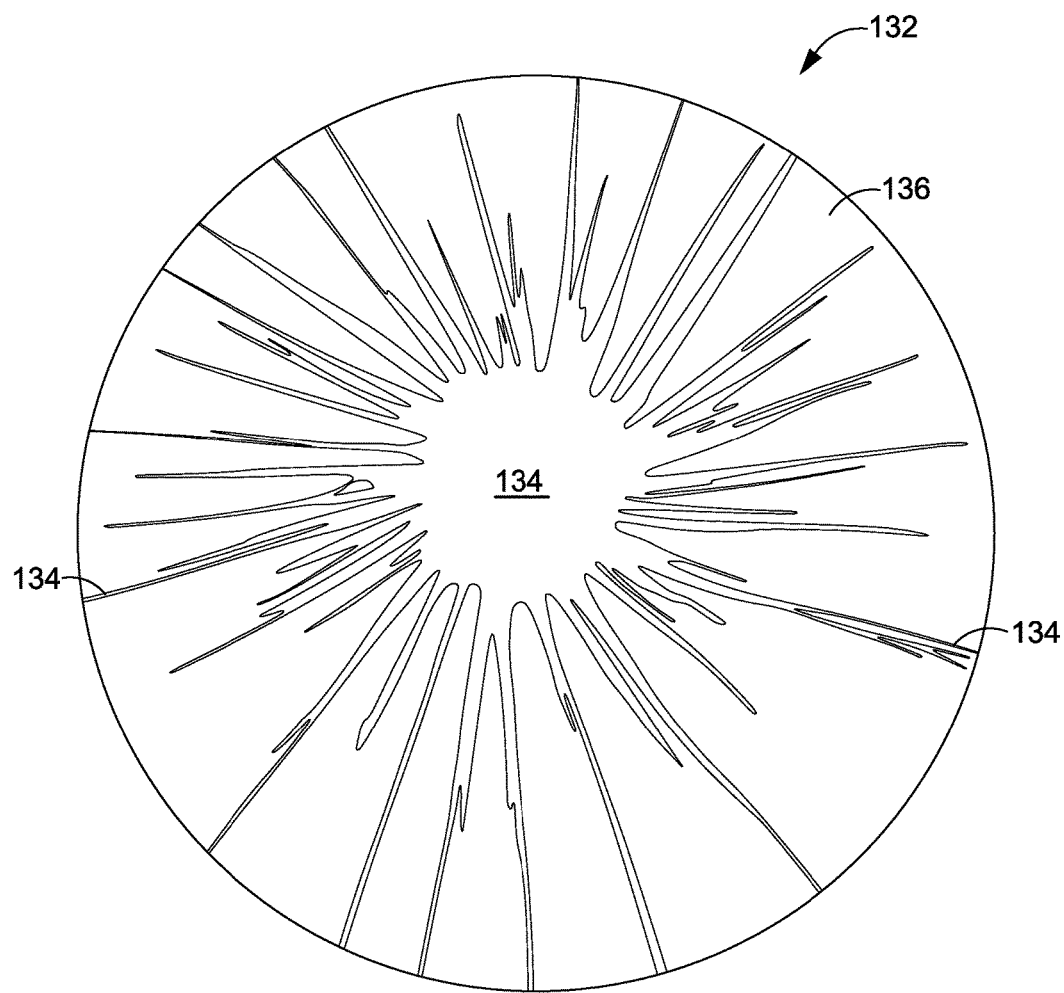
FIG. 11A is an elevation view of a first exemplary artwork design produced by a melting and spinning device using a single wax stick, in accordance with an embodiment of the present invention.

With reference to FIG. 11A, a first exemplary artwork 132 is created on a design surface 136 using a melting and spinning device, such as the device 10, in accordance with an embodiment of the present invention. In one aspect, the artwork 132 in FIG. 11A may be formed from melting a single wax stick with the device 10. As a spinning component holding the design surface 136 rotates, and melted portions of the wax stick are transferred to the design surface 136 from a melting component, the melted portions of the wax stick distribute radially on the design surface 136, creating a unique artwork design 134. Numerous variations of the artwork design 134 shown in FIG. 11A are possible by varying the speed of the spinning component, using different colors or types of wax sticks, or using multiple wax sticks sequentially melted and spun by the device 10. For example, an accelerated/decelerated spinning component may cause a first pattern of melted wax dispersion on the design surface in response to a first series of speed manipulations by a user. Subsequently, upon unlocking the cover and permitting the second wax stick to be positioned, the accelerated/decelerated spinning component may cause a second pattern of melted wax dispersion on the design surface, in response to a second series of speed manipulations by a user. In one aspect, one or more portions of the second pattern of melted wax dispersion may overlap one or more portions of the first pattern of melted wax dispersion. As such, the melting and spinning device may be used to generate a melted wax artwork having varying patterns of dispersion based on 1) the first color of wax stick used, 2) the first pattern of dispersion corresponding to the first user-manipulated acceleration/deceleration pattern of the spinning component, 3) the second color of wax stick used, and 4) the second pattern of dispersion corresponding to the second user-manipulated acceleration/deceleration pattern of the spinning component. In one embodiment, having positioned and melted a first wax stick for spinning onto the design surface, and subsequently positioning and melting a second wax stick for spinning onto the design surface and/or one or more portions of the first melted design, a complete melted design may be produced. In one aspect, a complete melted design includes one or more wax sticks melted onto the design surface according to one or more aspects of user manipulation of the melting and spinning device. In another aspect, the melting and spinning device may control a number of wax sticks permitted to be melted during a single session of using the device.

Figure 11B:
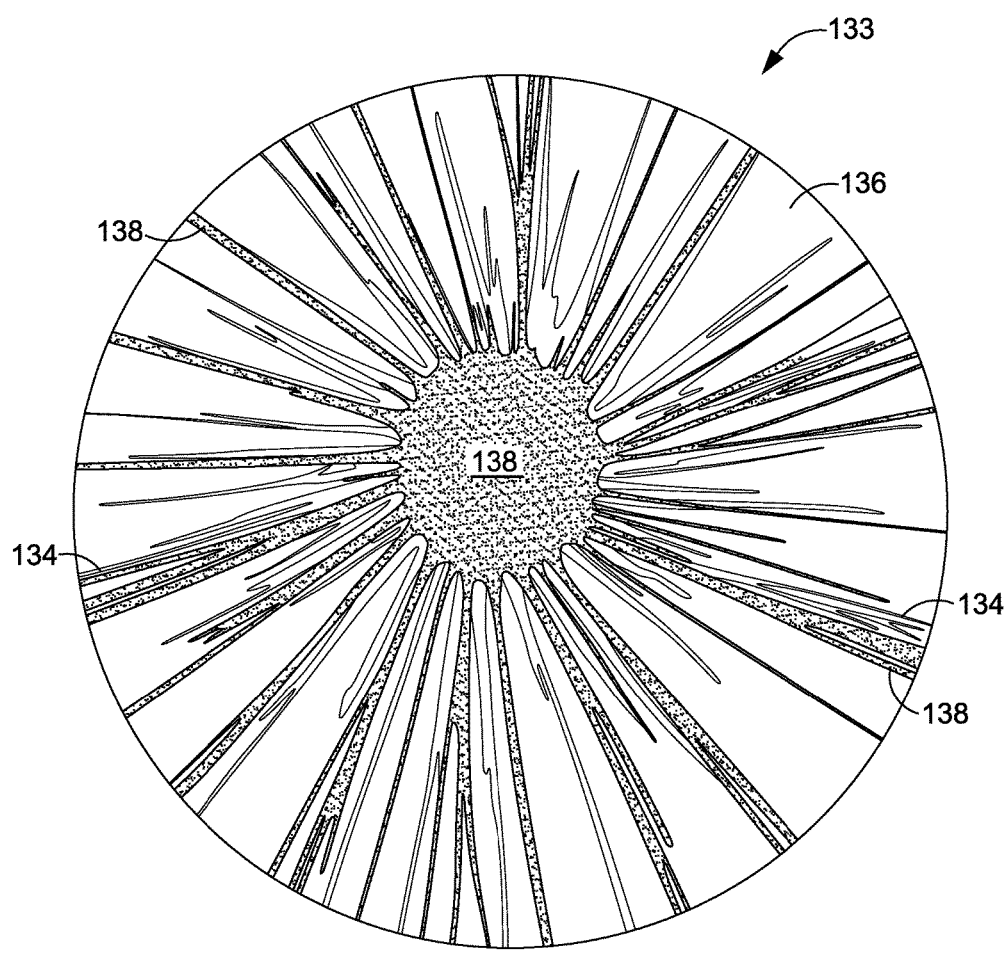
FIG. 11B is an elevation view of a second exemplary artwork design produced by a melting and spinning device upon the addition of a second, different wax stick to the artwork design of FIG. 11A, in accordance with an embodiment of the present invention.

Accordingly, FIG. 11B depicts a second exemplary artwork 133 created on a design surface 136 using a melting and spinning device, such as the melting and spinning device 10 shown in FIG. 1, in accordance with an embodiment of the present invention. In FIG. 11B, the artwork 133 is formed from melting a first wax stick having a first color and subsequently melting a second wax stick having a second color (e.g., using two melting and spinning processes, or two wax sticks in sequential melting and spinning processes). As a result, the artwork includes a first artwork design 134 formed from the first melted wax stick and a second artwork design 138 formed from the second melted wax stick, the second artwork design 138 overlapping the first artwork design 134. In some embodiments, based on user manipulation of an amount of speed of rotation by the spinning component, an appearance of a first melted and dispersed stick may be different from a second melted stick dispersed onto the same design surface.

Figure 12:
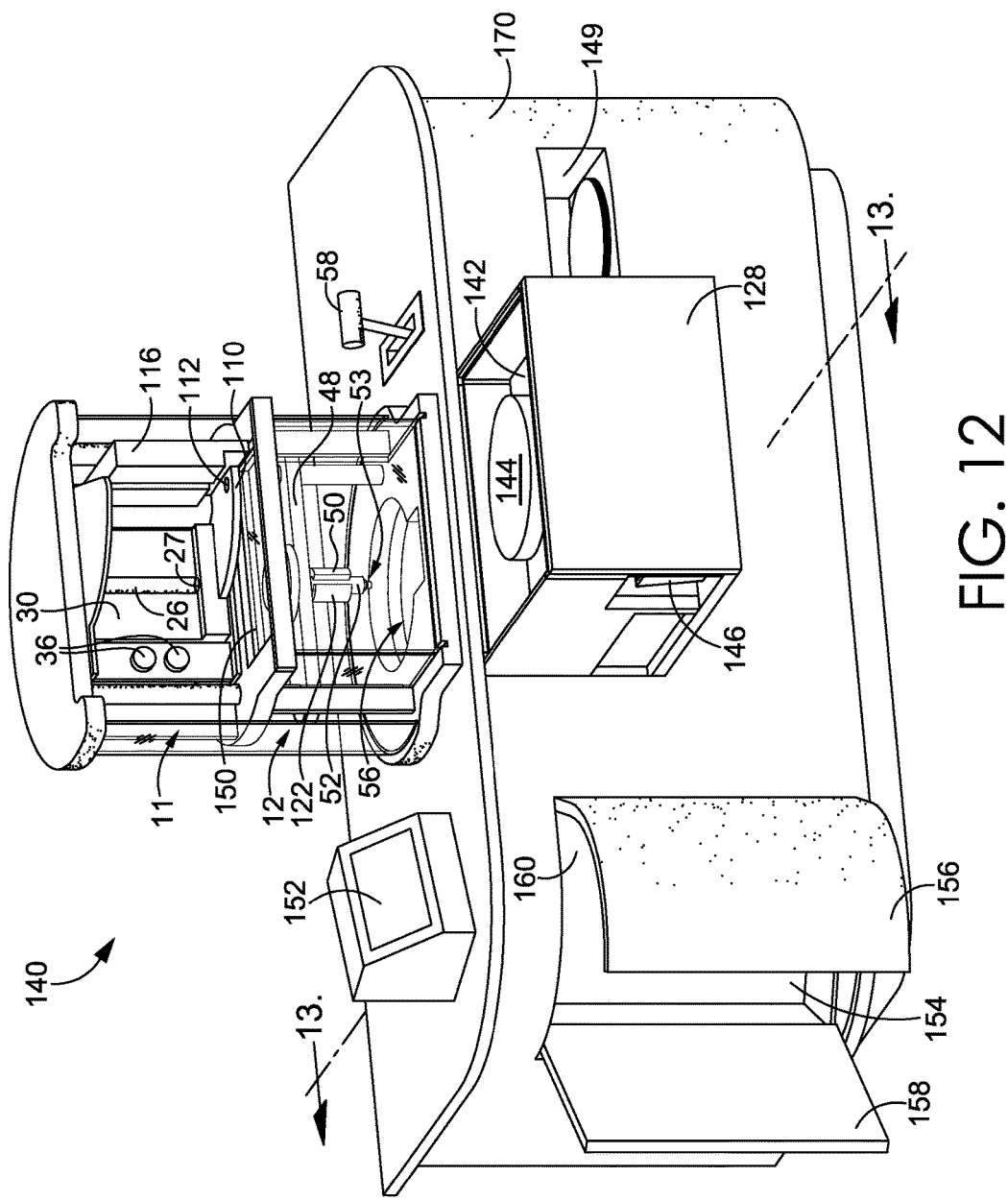
FIG. 12 is a front perspective view of a melting and spinning device with a drawer pulled out of the third compartment, in accordance with an embodiment of the present invention.

Turning next to FIG. 12, an exemplary melting and spinning device 140 is depicted in accordance with an embodiment of the present invention. FIG. 12 further includes, in some embodiments, a drawer 128 movably coupled to a stationary base 170 such that the drawer 128 can be pulled out of the stationary base 170. In FIG. 12, the drawer 128 is shown pulled out to reveal contents of the drawer 128, including a spinning component 144 upon which a design surface can be placed to create a design artwork with the device 140. At least a portion of the spinning component 144 is rotatably coupled to the drawer 128 and located in a box 142 toward the top of the drawer 128. In embodiments, the spinning component 144 is configured to magnetically couple to a motor 148 that is inside the stationary base 170 when the drawer 128 is pushed into stationary base 170, or rather, closed. In other words, in embodiments, opening and closing the drawer 128 allows the motor 148 and spinning component 144 to become decoupled and coupled. In FIG. 12, the motor 148 is fixed inside the stationary base 170 so that it does not have to be pulled out with the drawer 128, and may be substantially inaccessible from the drawer 128, for safety reasons. When the drawer 128 is closed, the motor 148 magnetically aligns with the spinning component 144, allowing the motor 148 to drive the spinning component 144 and spin a design surface placed on the spinning component 144. In embodiments, the drawer 128 also includes a drip pan 146 below the box 142 that houses the spinning component 144, the drip pan 146 being used for catching excess wax during the melting and spinning process, or during cleaning of the device 140. The box 142 may include holes on the bottom of the box 142 for channeling excess wax into the drip pan 146. Additionally, on an exterior of the stationary base 170, a storage shelf 149 may be provided for storing wax paper, artwork sheets, and/or other design surfaces for use with the device 140.

In one embodiment of the invention, the device 140 further includes an access compartment 154, which is located on a side of the stationary base 170. The access compartment 154 may include an exterior door 156 that generally conforms to the shape of the stationary base 170, and an interior door 158 that allows secured access to an interior 160 of the stationary base 170. In this respect, when the drawer 128 is fully pulled out, and the interior and exterior doors 158, 156 are opened, an operator may access an interior compartment 160 of the device 140 for cleaning, repair, and/or maintenance, according to one embodiment of the invention. In further aspects, the drip pan 146 may be accessed when the drawer 128 is open and/or when the drawer 128 is closed and the access compartment 154 is being used to access the interior 160 of the stationary base 170. In embodiments, the stationary base 170 may include wheels for moving the device 140, or securing elements for securing the device 140 in place, to prevent movement of the device 140 during operation.

As depicted in the exemplary embodiment, FIG. 12 also includes the first and second compartments 11, 12 being offset away from the front of the device 140, which allows a user to view the melting and spinning process through a window 150 on the top of the second compartment 12. In further aspects, a user interface 152 is provided to allow a user to view images and/or video of the melting and spinning process, or other images, video, and/or control features associated with the melting and spinning process. In one embodiment, one or more features displayed on the user interface 152 may be interacted with, such as through interaction with touch screen functionality of the device. The user interface 152 may also provide feedback such as time, speed of the spinning component, images of the artwork formed by the device, and other visual and/or audio-visual images.

Figure 13:
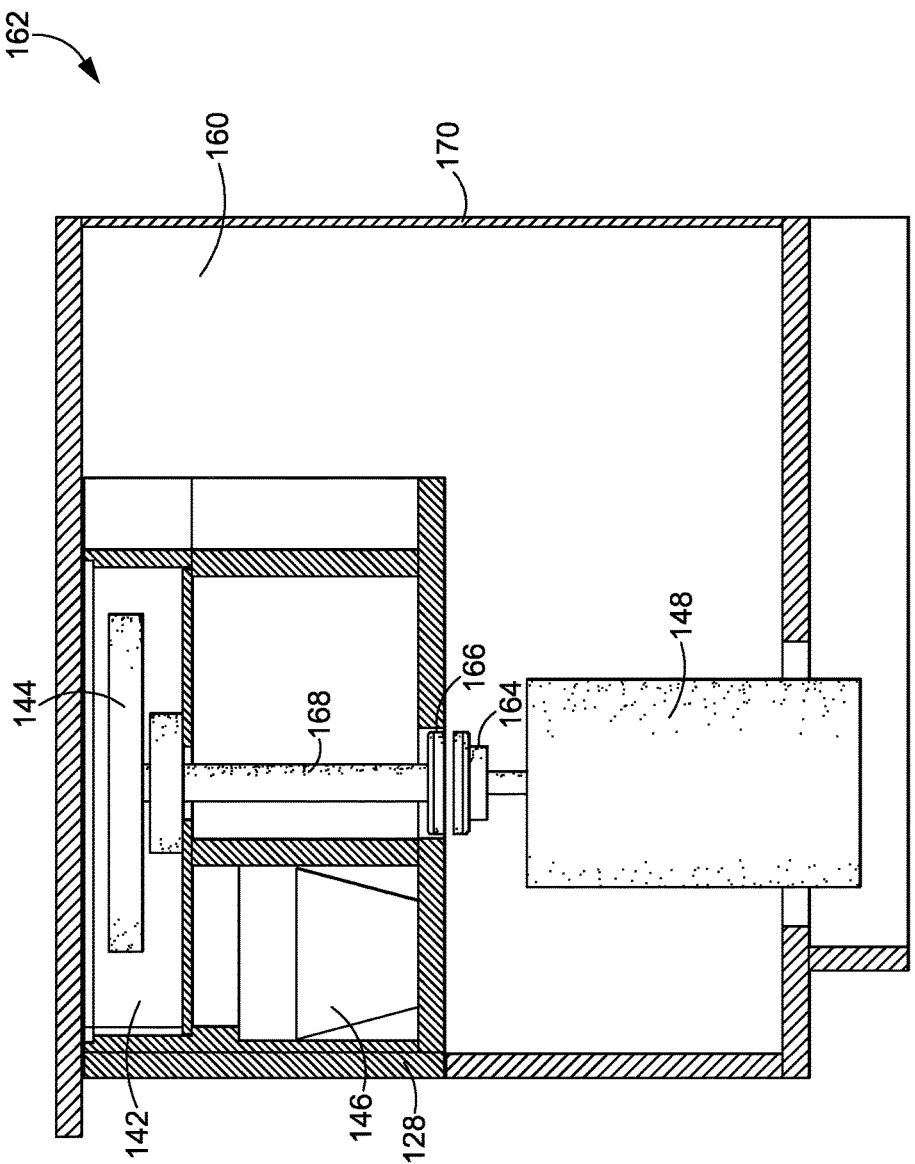
FIG. 13 depicts a side cross-sectional view of a third compartment of the melting and spinning device of FIG. 12, in accordance with an embodiment of the present invention.

Turning next to FIG. 13, a side cross-sectional view 162 of the stationary base 170 of the device 140 (shown in FIG. 12) is along a cut line 13, in accordance with an embodiment of the present invention. FIG. 13 shows the motor 148 in the stationary base 170 aligned with the spinning component 144 in the drawer 128 when the drawer 128 is closed. In FIG. 13, the motor 148 and the spinning component 144 may be magnetically coupled, such that the motor 148 drives the spinning component 144 to generate a spinning design surface placed on the spinning component 144. In further embodiments, the motor 148 and the spinning component 144 are rotatably coupled with a first magnetic coupling 164 and a second magnetic coupling 166 that magnetically affix to each other when the drawer 128 is closed. The second magnetic coupling 166 may be rotatably coupled to a drive shaft 168 that extends through the drawer 128 and is rotatably coupled to the spinning component 144. In further aspects of the invention, a nozzle 52 in a second compartment 12 of the device 140 is configured to drip melted portions of one or more wax sticks onto a design surface placed on the spinning component 144.

Additionally, as further shown in FIG. 12, excess wax may be directed into the drip pan 146 below the box 142 holding the spinning component 144. FIG. 12 also shows a cross-section of the interior 160 of the stationary base 170 inside the device 140, which is accessible from the exterior and interior doors 156, 158 for cleaning, repair, and/or maintenance of the components and sections of the device 140 inside the second compartment 12 and the stationary base 170.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned elements, components, and steps can be completed without departing from the scope of the claims below. Certain features and subcombinations are of utility and may be employed without reference to other features and subcombinations and are contemplated within the scope of the claims.

The invention claimed is:

1. A melting and spinning device for creating a design on a design surface, the device comprising:
    a first compartment having a receiving and positioning component that includes a channel configured to receive and position a wax stick;
    a second compartment having a melting component, the melting component including a heating element, a temperature measurement element, and a nozzle,
        wherein the nozzle includes a nozzle tip and a nozzle opening, and
        wherein the nozzle opening is directly aligned with the channel of the receiving and positioning component and is configured to receive the wax stick; and
    a third compartment at least partially enclosing a spinning component coupled to a motor component that rotates the spinning component when the motor component is in operation,
    wherein the first, second, and third compartments are coupled together in a stacked configuration, and
    wherein the second compartment includes a window providing a view into the second compartment.

2. The melting and spinning device of claim 1, wherein the first compartment includes a hinged cover that is opened to provide access to the channel.

3. The melting and spinning device of claim 2, wherein the device further includes a releasing mechanism that is operable to control movement of the wax stick from the channel to the nozzle.

4. The melting and spinning device of claim 3, wherein the hinged cover includes a handle.

5. The melting and spinning device of claim 1, wherein the third compartment includes a drawer configured to slide open to provide access to the third compartment, and wherein at least a portion of the spinning component is coupled to the drawer such that it moves with the drawer when the drawer is slid open.

6. The melting and spinning device of claim 5, wherein the third compartment includes a latching mechanism for securing the drawer in a closed position.

7. The melting and spinning device of claim 1, wherein the melting component is coupled to a support element located within the second compartment, and wherein the support element is repositionable at any one of a plurality of different locations within the second compartment that are spaced from a bottom of the first compartment by different distances.

8. The melting and spinning device of claim 1, wherein the first compartment and the second compartment are each at least partially cylindrical in shape.

9. The melting and spinning device of claim 1, wherein at least a portion of the heating element comprises an electric heating band.

10. The melting and spinning device of claim 1, wherein the spinning component and the motor component are configured to be magnetically coupled.

11. The melting and spinning device of claim 1, wherein the temperature measurement element is a thermocouple.

12. The melting and spinning device of claim 1, wherein the device includes a stationary base having a door that allows access to at least a portion of an interior of the device.

13. The melting and spinning device of claim 12, wherein the interior includes a lighting element.

14. The melting and spinning device of claim 1, further comprising a user interface coupled to the device.

15. A system for creating a design on a design surface, the system comprising:
- a receiving and positioning component at least partially enclosed within a first compartment for receiving and positioning one or more wax sticks;
- a melting component at least partially enclosed within a second compartment for melting the one or more wax sticks to provide melted portions of the one or more wax sticks; and
- a spinning component at least partially enclosed within a third compartment for spinning the design surface, the design surface positioned to receive the melted portions of the one or more wax sticks from the melting component,
- wherein the first, second, and third compartments are coupled together in a stacked configuration,
- wherein the third compartment includes a drawer configured to slide open to provide access to the third compartment, and
- wherein at least a portion of the spinning component is coupled to the drawer such that it moves with the drawer when the drawer is slid open.

16. The system of claim 15, wherein at least one of the first, second, and third compartments includes a window.

* * * * *